United States Patent
Kubo et al.

(10) Patent No.: US 6,896,839 B2
(45) Date of Patent: May 24, 2005

(54) THREE-DIMENSIONAL MOLDING APPARATUS AND THREE-DIMENSIONAL MOLDING METHOD

(75) Inventors: Naoki Kubo, Osaka (JP); Toshio Norita, Osaka (JP); Makoto Miyazaki, Osaka (JP); Akira Wada, Osaka (JP)

(73) Assignee: Minolta Co., Ltd., Osaka (JP)

(*) Notice: Subject to any disclaimer, the term of this patent is extended or adjusted under 35 U.S.C. 154(b) by 257 days.

(21) Appl. No.: 10/062,542

(22) Filed: Feb. 5, 2002

(65) Prior Publication Data

US 2002/0105114 A1 Aug. 8, 2002

(30) Foreign Application Priority Data

| Feb. 7, 2001 | (JP) | P2001-030888 |
| Mar. 29, 2001 | (JP) | P2001-096147 |
| May 25, 2001 | (JP) | P2001-157751 |

(51) Int. Cl.[7] .......................... B29C 67/00; B29C 31/04
(52) U.S. Cl. ....................... 264/460; 264/109; 264/128; 264/308; 425/174; 425/174.4
(58) Field of Search ............................ 264/460, 109, 264/128, 308; 425/174, 174.2, 174.4

(56) References Cited

U.S. PATENT DOCUMENTS

| 5,204,055 A | 4/1993 | Sachs et al. |
| 5,387,380 A | 2/1995 | Cima et al. |
| 6,007,318 A * | 12/1999 | Russell et al. .............. 425/130 |
| 6,375,874 B1 * | 4/2002 | Russell et al. ................ 264/28 |
| 6,610,429 B2 * | 8/2003 | Bredt et al. ................. 428/703 |

OTHER PUBLICATIONS

US 4,937,420, 6/1990, Deckard (withdrawn)

* cited by examiner

Primary Examiner—Mary Lynn Theisen
(74) Attorney, Agent, or Firm—McDermott Will & Emery LLP

(57) ABSTRACT

To provide a three-dimensional molding technique capable of generating a three-dimensional molded article in short time.

In a three-dimensional molding apparatus, a powder material is allowed to drop via an opening while moving a thin layer formation section in the +X direction, thereby forming a powder layer on a molding stage. With respect to a selected region in the powder layer, a binder of ultraviolet-ray hardening resin is discharged from a head section. Then, the powder layer is irradiated with ultraviolet rays from an ultraviolet irradiation section, making the ultraviolet-ray hardening resin applied on the powder layer harden to thereby bind the powder material. By repeating this operation with respect to the powder layer which is sequentially formed, a three-dimensional molded article is formed. In this way, since an ultraviolet-ray hardening resin is used as a binder and a powder material can be bound rapidly by ultraviolet irradiation, it is possible to generate a three-dimensional molded article in short time.

19 Claims, 29 Drawing Sheets

C:CYAN
W:WHITE

C:CYAN
Y:YELLOW
W:WHITE

F I G. 23
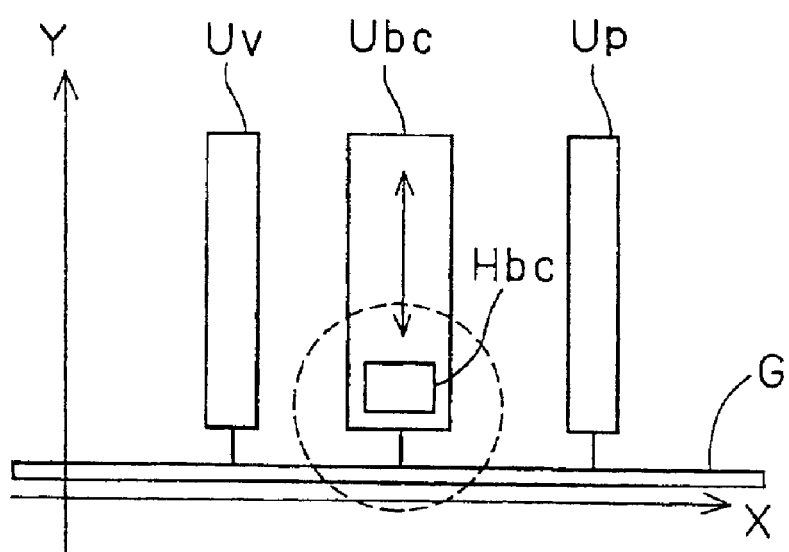

F I G . 3 5 A
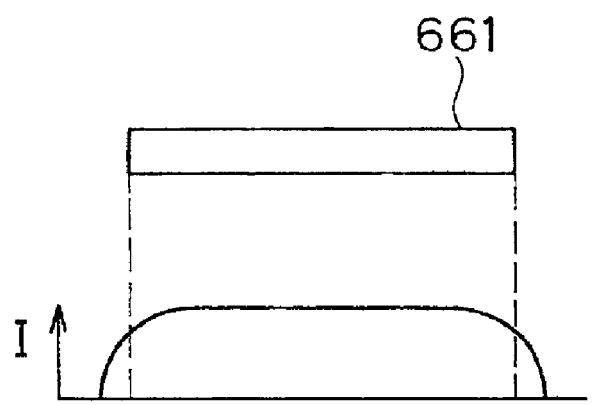
F I G . 3 5 B
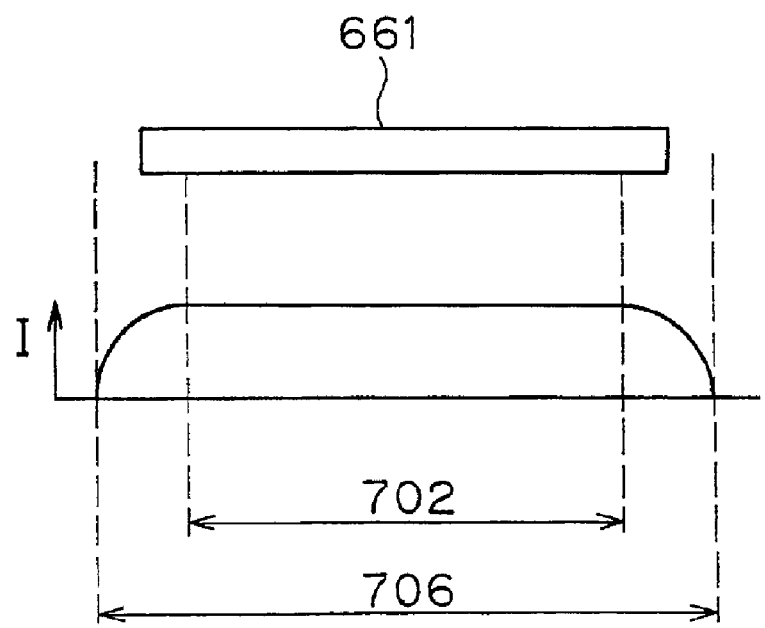

THREE-DIMENSIONAL MOLDING APPARATUS AND THREE-DIMENSIONAL MOLDING METHOD

This application is based on application Nos. 2001-30888, 2001-96147 and 2001-157751 filed in Japan, the contents of which are hereby incorporated by reference.

BACKGROUND OF THE INVENTION

1. Field of the Invention

The present invention relates to a three-dimensional molding technique, and more particularly to a three-dimensional molding technique for generating a three-dimensional molded article by allowing a powder material to bind by applying a binder.

2. Description of the Background Art

As conventional three-dimensional molding apparatuses, there is known an apparatus whereby a binder which will harden when dried is discharged to a layer of powder material by means of inkjet and the like, and a bound body of the powder material is sequentially formed to mold a three-dimensional molded article. In such a three-dimensional molding apparatus, the operations as will be described below will be carried out for generating a three-dimensional molded article, for example.

At first a powder material of gypsum or starch is uniformly spread in a thin layer by means of a roller mechanism or the like. Next, a region where the powder material is to be molded in this thin layer is scanned by an inkjet head and then a binder which will harden when dried is applied. The powder material in the region where the binder was applied binds to a lower layer or a hardening region adjacent thereto. The process of sequentially forming a thin layer of powder material and applying a binder is repeated until molding is completed. Once molding has completed, the powder material in regions where the binder is not applied keep the condition that particles of powder are independent of each other, the three-dimensional molded article that has been bound by the binder can be taken out.

However, in the three-dimensional molding apparatus mentioned above, since a binder which will harden when dried is used, a time for drying the binder to bind the powder material after application of the binder is required, which hinders speed up of molding.

In addition, in the case of applying the above-mentioned binder using an inkjet head, the hole diameter of the nozzle portion is small (not more than 20 μm), so that when a binder having a strong adhesive strength is used, the binder will easily harden due to drying and likely to cause blocking. If such a malfunction occurs, the powder material in the region where the binder is to be applied will not be bound by the blocked nozzle, which will lead deterioration of shape accuracy and strength of a resultant three-dimensional molded article.

For this reason, in the case where an inkjet head is used, only a binder of weak adhesive strength can be used, and the strength of a finished three-dimensional molded article becomes low. In addition, in such a case, only a powder material which will bind by means of a binder having a weak adhesive strength can be used, so that the flexibility in selecting the powder material is limited.

SUMMARY OF THE INVENTION

The present invention is directed to a three-dimensional molding apparatus for forming a three-dimensional molded article by biding a powder material.

According to the present invention, the present apparatus is a three-dimensional molding apparatus for forming a three-dimensional molded article by binding a powder material, the apparatus comprising:(a) a layer formation device for sequentially forming a layer of a powder material; (b) a binder applying device for applying a binder which will harden in response to a certain energy to a selected region in the layer of the powder material; and (c) an energy supply device for supplying the certain energy to the binder applied to the powder material, wherein a bound body of the powder material is formed by the binder to harden in response to the certain energy supplied from the energy supply device.

Therefore, it is possible to form a three-dimensional molded article in short time.

In a preferred embodiment of the present invention, the present apparatus is characterized in that the energy supply device supplies the certain energy to each layer of the powder material which is formed sequentially.

Therefore, it is possible to conduct three-dimensional molding securely. Also the present invention is directed to a three-dimensional molding method.

Therefore, it is an object of the present invention to provide a three-dimensional molding technique capable of generating a three-dimensional molded article in short time.

These and other objects, features, aspects and advantages of the present invention will become more apparent from the following detailed description of the present invention when taken in conjugation with the accompanying drawings.

BRIEF DESCRIPTION OF THE DRAWINGS

FIG. 23 is a view showing other configurations in the thin layer formation section and the binder applying section;

FIG. 35A is a view showing a relationship between the ultraviolet lamp and an intensity of ultraviolet ray on the molding stage, and FIG. 35B is a view showing a relationship between the ultraviolet irradiation region on the molding stage by the ultraviolet lamp in FIG. 35A and the molding region;

DESCRIPTION OF THE PREFERRED EMBODIMENTS

<First Preferred Embodiment>
<Essential Configuration of the Three Dimensional Molding Apparatus>

Figure 1:
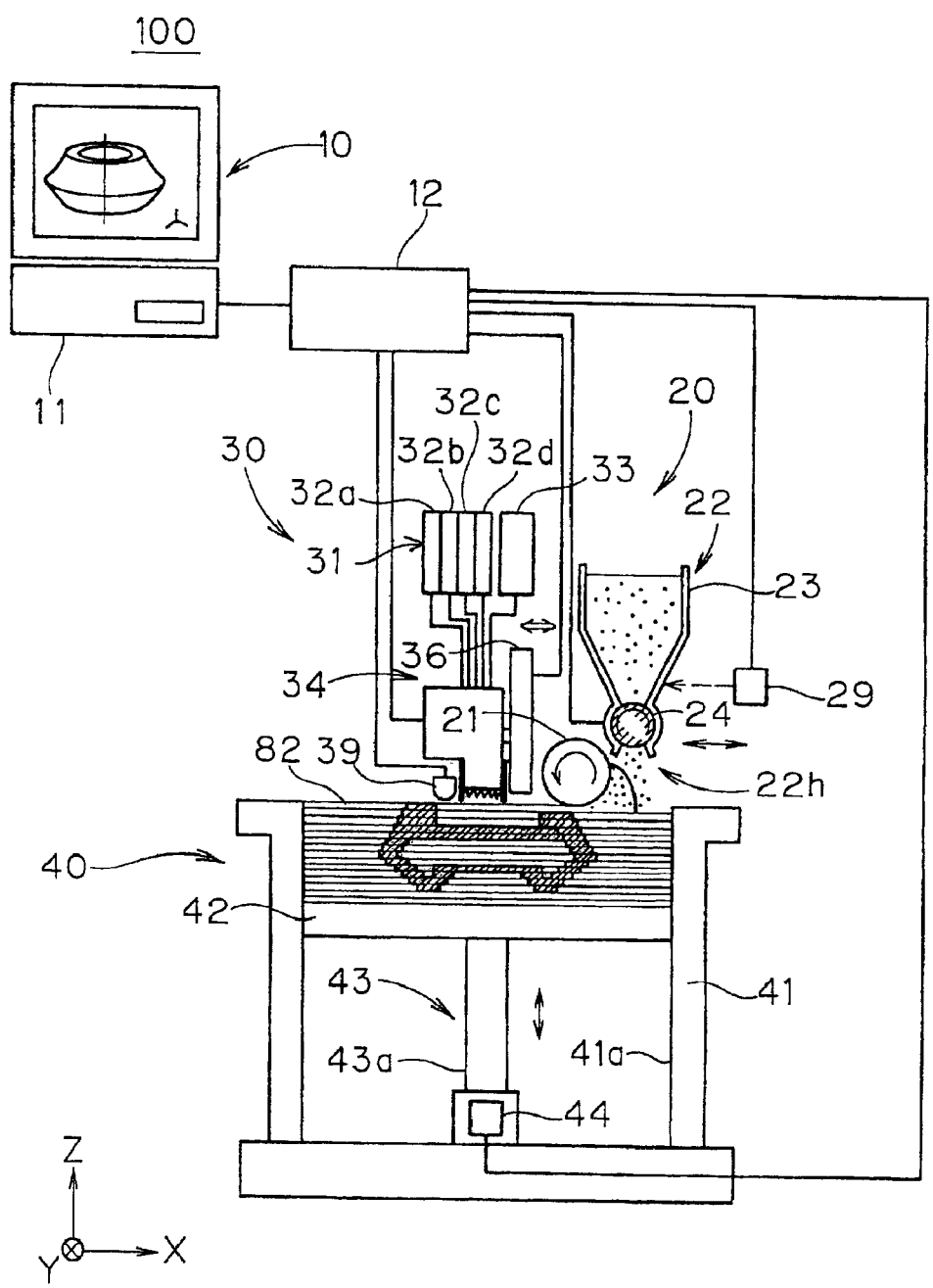
FIG. 1 is a view showing an essential configuration of a three-dimensional molding apparatus according to a first preferred embodiment of the present invention.

FIG. 1 is a view showing an essential configuration of a three-dimensional molding apparatus 100 according to a first preferred embodiment of the present invention.

The three-dimensional molding apparatus 100 comprises a control section 10 and thin layer formation section 20 and a binder applying section 30 and a molding section 40.

The control section 10 includes a computer 11 and a drive control section 12 which is electrically connected with the computer 11.

The computer 11 can be a general desk top type computer or the like having a CPU, a memory and the like incorporated therein. This computer 11 generates shape data of a molded article of three-dimensional shape and outputs cross section data obtainable by slicing the molded article into a multiplicity of parallel thin cross sections, to the drive control section 12.

The drive control section 12 functions as control means for individually driving the thin layer formation section 20, the binder applying section 30 and the molding section 40. Upon acquiring cross section data from the computer 11, the drive control section 12 performs central control by providing, in accordance with the cross section data, each section as mentioned above with a drive instruction, thereby making the molding section 40 feed and extend the powder material, as well as making the molding section 40 sequentially form a bound body of the powder layer by layer.

In addition, the drive control section 12 specifies a selection area where the powder material is to be bound based on the cross section data, and carries out drive control so that a binder is to be discharged to the selection area whenever the thin layer formation section 20 forms a thin layer of the powder material corresponding to one layer.

The thin layer formation section 20 comprises an extension roller 21, a powder feed mechanism 22, and a driving section 29 having, for example, a motor functioning as layer formation means. The thin layer formation section 20 is movable in the X direction by means of the driving section 29.

The extension roller 21 and the powder feed mechanism 22 extend along the Y direction and are so configured that only a single operation along the X direction by the driving section 29 enables formation of a thin layer of the powder material in the molding section 40.

The powder feed mechanism 22 is provided so that when the thin layer formation section 20 moves in the +X direction, it is located on the front side in the advance direction of the extension roller 21 (that is, downstream side of the advance direction). And when the thin layer formation section 20 moves in the +X direction, the extension roller 21 and the powder feed mechanism 22 are activated, and the powder feed mechanism 22 supplies a powder material to the front side in the moving direction of the extension roller 21.

The top side of the powder feed mechanism 22 is configured as a powder vessel 23 for accommodating a powder material such as gypsum or starch, and a feed roller 24 of porous is provided on the lower side of the powder vessel 23.

A surface of the feed roller 24 is porous, and, holes in the part contacting with the powder material in the powder vessel are filled with the powder material. And as the feed roller 24 rotates, the powder material filled in the holes of the roller surface is led toward an opening 22h formed at the lowermost part of the powder feed mechanism 22, and the powder material drops through the opening 22h to be fed to the molding section 40.

The extension roller 21 is configured so as to rotate in synchronization with rotation of the feed roller 24. With such a configuration, it becomes possible to appropriately extend the powder material having dropped through the opening 22h of the powder feed mechanism 22.

As for the powder material accommodated in the powder vessel 23, white materials are preferred for realizing excellent coloring. In the case where printing is made on white paper or the like, gradation expression of color becomes possible based on the balance of the base material and white color by applying colored ink only on a part to be colored, and the same also applies to coloring of three-dimensional molded article, so that it is preferred to use a white powder material.

The binder applying section 30 includes a tank part 31 and a head section 34 and an ultraviolet irradiation section 39.

The tank part 31 has four ink tanks 32 and a binder tank 33.

The ink tanks 32a to 32d accommodate different kinds of liquid ink which are colored by different color components, that is, three primary colors of Y (yellow), M (magenta) and C (cyan), and W (white). It is preferred that each ink serving as a coloring carrier will not discolor after binding to the powder material and will not discolor or fade even after a long elapsed time.

The binder tank 33 is formed of a light shield material, and accommodates an ultraviolet-ray hardening resin in the liquid state. About this ultraviolet-ray hardening resin, those having low viscosity so as to allow discharge using an inkjet head, for example, acrylic monomer type resins having low molecular weight are preferable. In addition, as the ultraviolet-ray hardening resin, resins of epoxy system can also be used.

A tube is laid in each of the ink tanks 32a to 32d, and the binder tank 33, which individually leads the liquid in the tank to a head section 34. This Tube laid from the binder tank 33 to the head section 34 is formed of a light shield material.

Figure 2:
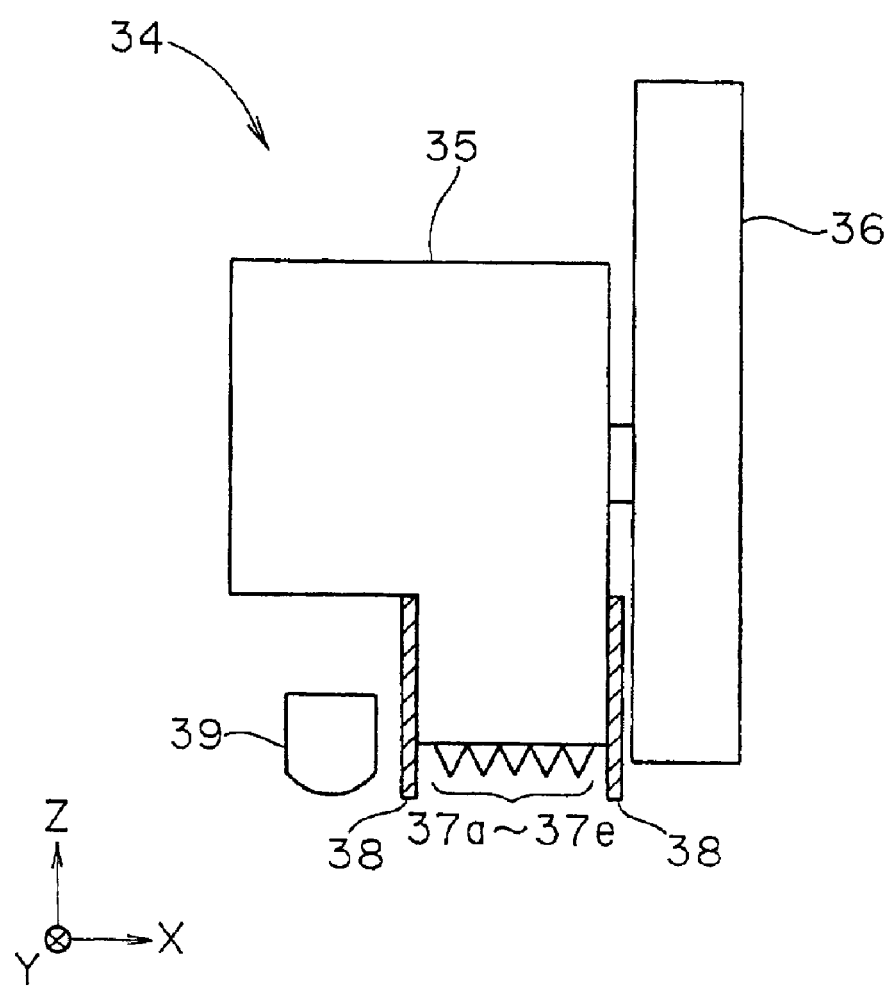
FIG. 2 is a view showing an essential configuration of a head section.

FIG. 2 is a view showing an essential configuration of the head section 34.

The head section 34 includes a head section main body 35, a driving section 36 in connection with the head section main body 35, a plurality of discharge nozzles 37a to 37e projecting on the bottom of the head section main body 35 and a light shielding panel 38.

The head section 34 is configured so that the discharge nozzles 37a to 37e can discharge (blow off) the above-mentioned inks of variety of colors and ultraviolet-ray hardening resin in the form of micro particles by means of the inkjet system. This head section 34 is preferably configured as a detachable inkjet head of the piezo system, that is, configured as a heed which achieves discharging by using a discharge force obtainable by a volume change due to deflection of piezoelectric element. With the head section 34 having such a configuration, a stable discharge can be realized irrespective of the physical property of the binder which is an ultraviolet-ray hardening resin, and even in case a trouble such as blocking occurs in the discharge nozzle 37 due to hardening of the binder in the head section 34, it is possible to quickly recover because the head is detachable and hence can easily be replaced.

The driving section 36 makes the head section 34 movable in the X direction along the guide rail (not shown) extending in the X direction.

Each discharge nozzle 37a to 37e has a multi-nozzle mechanism having a plurality of binder discharge ports in the Y direction, and the drive control section 12 can separately control of discharging the binder while selecting binder discharge ports required for forming a bounded body of the powder from the plurality of binder discharge ports. And the ink and the ultraviolet-ray hardening resin discharged from each of the discharge nozzles 37a to 37e come into adhesion with a powder layer 82 provided in the position opposing to the discharge nozzles 37.

The light shielding panel 38 is formed so as to cover the discharge nozzles 37 in a rectangular shape, thereby preventing the light including the ultraviolet ray from reaching the discharge nozzle 37e. With this light shielding panel 38, it is possible to prevent blocking of the discharge nozzle 37e.

The ultraviolet irradiation section 39 is a part for emitting an ultraviolet ray serving as optical energy according to the wavelength of the ultraviolet region with respect to the powder layer 82 in order to harden the ultraviolet-ray hardening resin supplied to the powder layer 82 to bind the powder material.

Returning to FIG. 1, explanation will be continued.

A molding section 40 has a molding section main body 41 having a concave part at its center, a molding stage 42 provided inside the concave part of the molding section main body 41, a Z directional movement section 43 for moving the molding stage 42 in the Z direction and a driving section 44 for driving the Z directional movement section 43.

The molding section main body 41 serves to provide a working area for generating a three-dimensional molded article.

The molding stage 42 has a rectangular shape in XY cross section, and its side surface contacts with a vertical inside wall 41a of the concave part in the molding section main body 41. And the rectangular three-dimensional space that is formed by the molding stage 42 and the vertical inside wall 41a of the molding section main body 41 functions as a molding space for generating a three-dimensional molded article. In brief, on the molding stage 42, a powder material is adhered by the binder discharged from the discharge nozzle 37e, and thus a three-dimensional molded article is formed.

The Z directional movement section 43 has a supporting rod 43a connecting with the molding stage 42. And, the supporting rod 43a is driven to move up and down in the vertical direction by means of the driving section 44, allowing the molding stage 42 which is connected with the supporting rod 43a to move in the Z direction.

<Operation of the Three dimensions Molding Apparatus 100>

Figure 3:
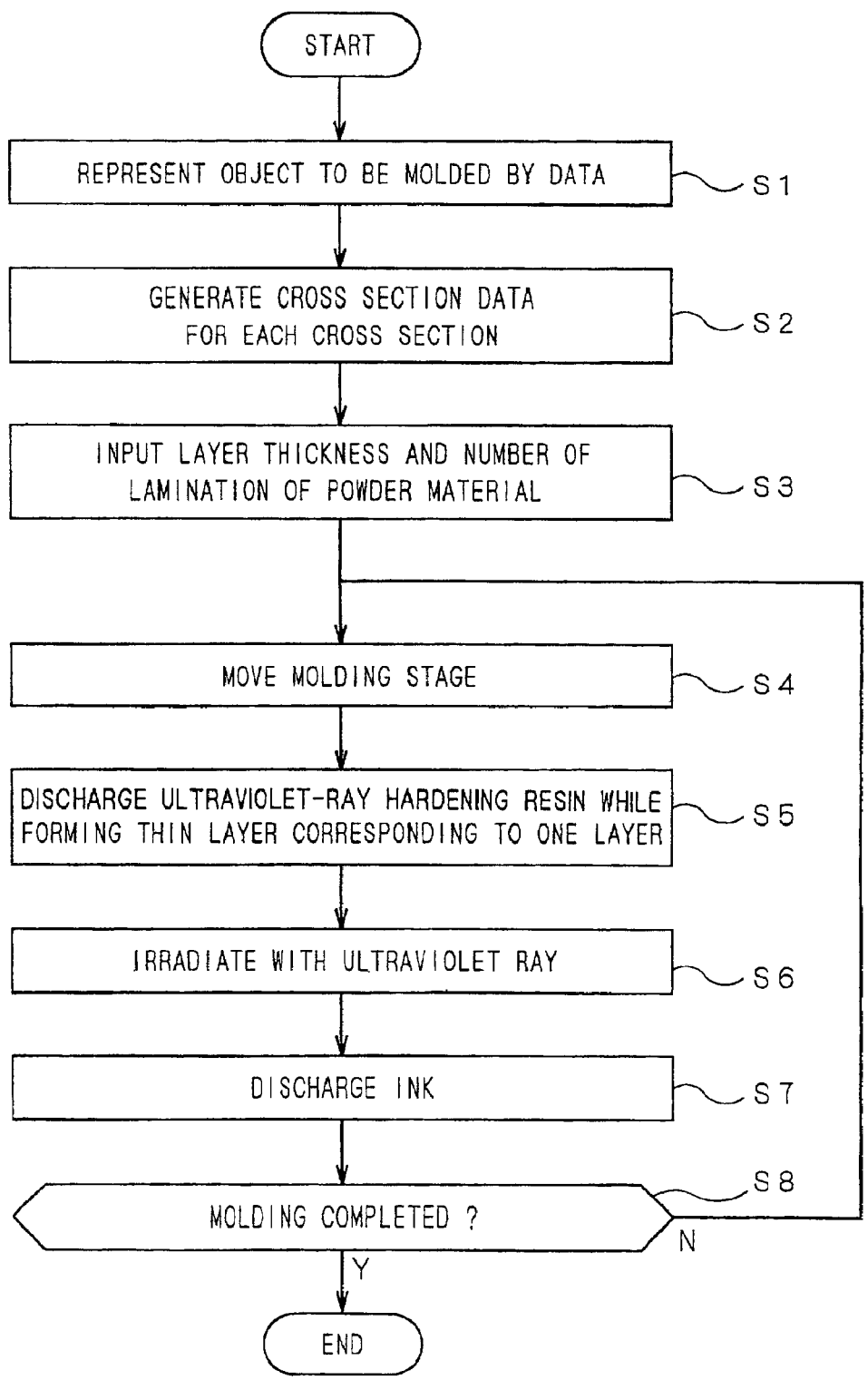
FIG. 3 is a flow chart showing a basic operation of the three-dimensional molding apparatus.

FIG. 3 is a flow chart showing a basic operation of three-dimensional molding apparatus 100. In the following, the basic operation will be explained with reference to FIG. 3.

In step S1, the computer 11 generates model data expressing a three-dimensional molded article having a color patterned surface. As the shape data which will be a base for molding, color three-dimensional model data generated by general three-dimensional CAD modeling software can used. In addition, it is also possible to use shape data and texture measured with a three-dimensional shape input device.

In model data, those having color information provided for only the surface of a three-dimensional model and those having color information provided for the interior of the model. Also in the case of molding the latter data, only color information for model surface may be used, or color information for the interior of the model may be used. For example, in generating a three-dimensional molded article of human body models or the like, there is a case that the internal organs are desired to be colored in different colors, and in such a case, color information of the interior of the model is used.

In step S2, the computer 11 generates cross section data for each cross section obtained by slicing an object to be molded in the horizontal direction from the above-mentioned mode data. Cross section pieces obtained by slicing at a pitch (layer thickness t) corresponding to a thickness of one layer of the powder to be laminated are cut out from the model data, and shape data and coloring data are generated. The pitch of the slicing can be varied within a predetermined range (the range capable of binding the powder).

Figure 4:
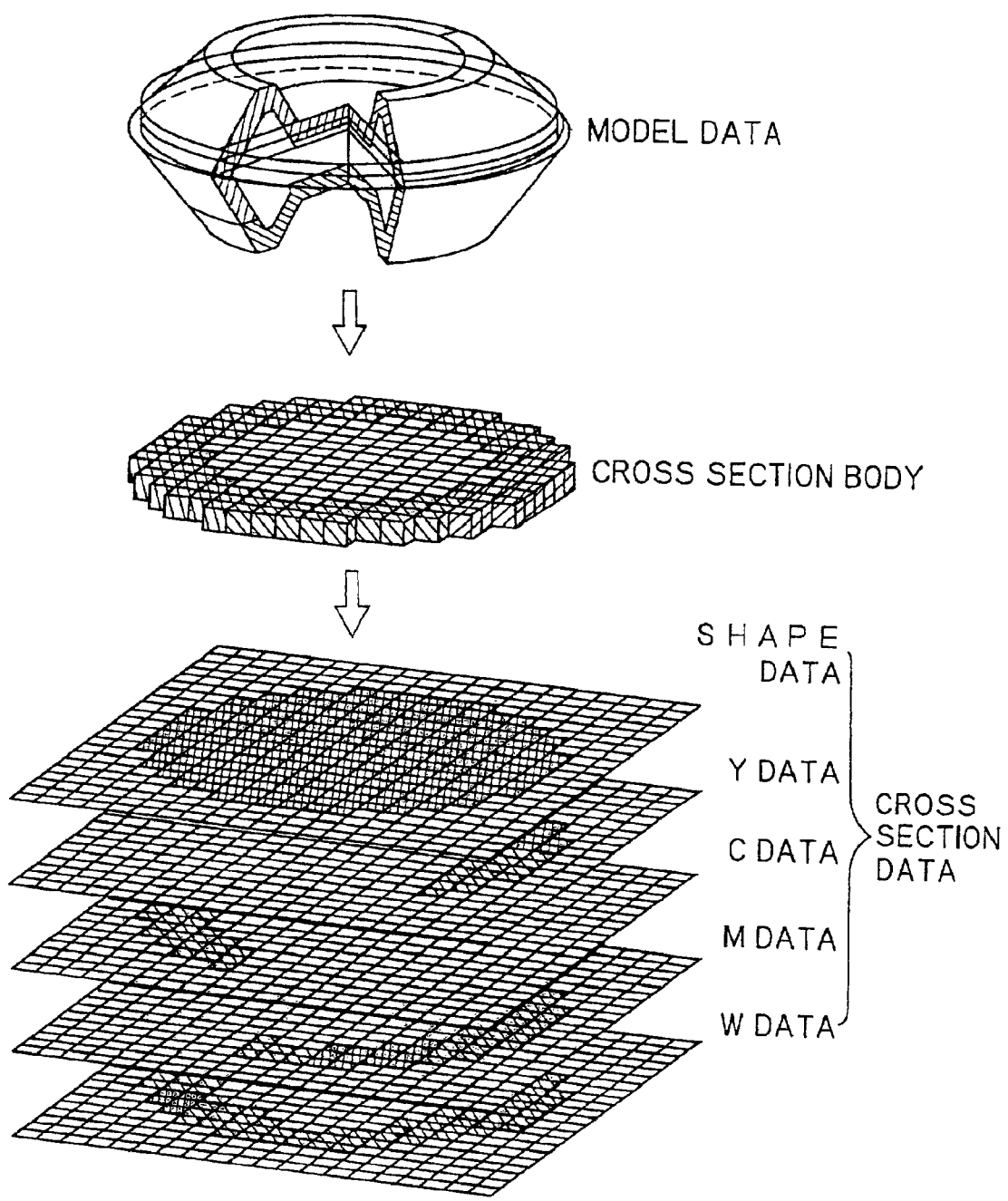
FIG. 4 is a view showing one example of cross section data.

FIG. 4 is a view showing an example of cross section data generated in step S2. As shown in FIG. 4, cross section pieces are cut out including color information from the model data and fragmented in a grid manner. Then the fragments are converted to bit map information of the respective colors by handling them in the same manner as a bit map of two-dimensional image. This bit map information is information in consideration of gradation and the like. Now, only a part appearing in a face of a three-dimensional molded article has color information of YCMW.

In step S3, information about laminating thickness of the powder (slice pitch in creating cross section data) and number of layers to be laminated (number of cross section data sets) is inputted to the drive control section 12 from the computer 11.

Figure 5A:
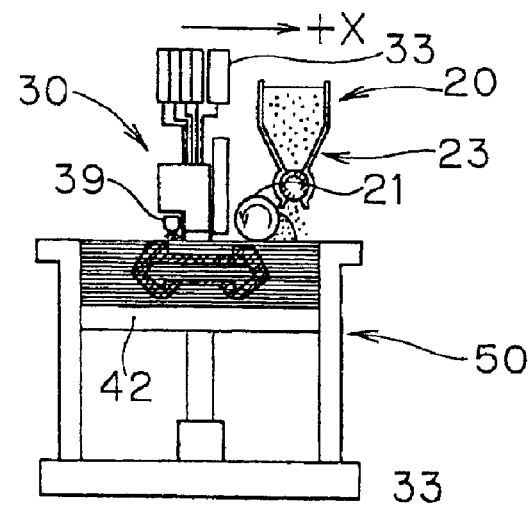
FIGS. 5A to 5C are view for explaining the operation of the three-dimensional molding apparatus.
Figure 5B:
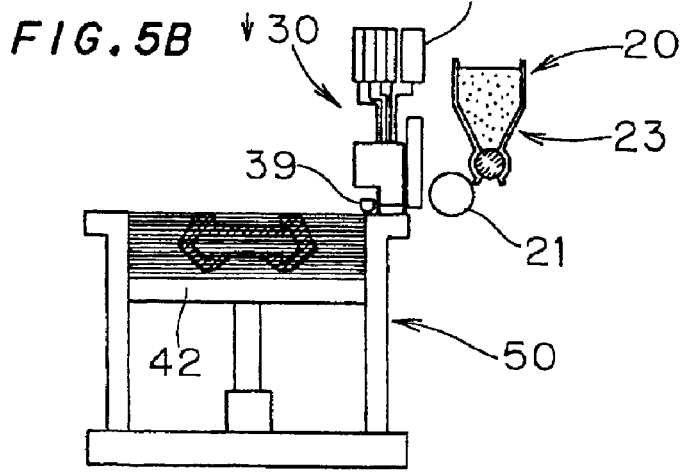
Figure 5C:
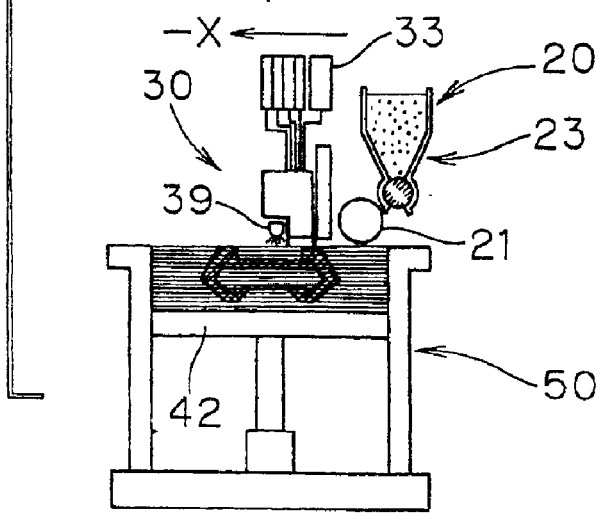

Step S4 and the subsequent steps are operations executed by the drive control section 12 to control each part. FIGS. 5A to 5C are conceptual diagrams for explaining these operations. In the following, explanation will be made while referring to FIGS. 5A to 5C.

In step S4, for generating a bound body of the Nth layer (N=1, 2, . . . ) of powder in the molding stage 42, on the basis of the layer thickness t inputted from the computer 11, the molding stage 42 is moved down by a distance corresponding to that thickness by means of the Z directional movement section 43 to be held at that position . In an initial state, the molding stage 42 is located at the same level with the upper end of the molding section 40, and from which position, the molding stage 42 is moved down by a distance corresponding to the layer thickness t. And, the molding stage 42 moves down stepwise by a distance corresponding to the layer thickness t every time a layer of powder material is formed. Consequently, a powder material is deposited on the molding stage 42, and a space for generating a new layer of powder for one layer is formed on the top of the powder layer in which necessary binding by the binder has completed.

In step S5, by moving the thin layer formation section 20 in the +X direction, formation of thin layer of powder material of one layer is performed while supplying powder which is a material for molding of a three-dimensional molded article, as well as binding of necessary part of the powder material is executed by discharging an ultraviolet-ray hardening resin from the head section 34 to a predetermined region.

As shown in FIG. 5A, when the thin layer formation section 20 moves in the +X direction, it moves down so that the lowermost point of the extension roller 21 is at the same level with the upper end of the molding section 40, so that uniform thin layer formation of powder material is secured by the powder feed mechanism 22 and the extension roller 21.

The amount of powder material fed from the powder feed mechanism 22 for formation of one layer (during a single movement along the X direction) is determined to be slightly larger than is necessary for formation of one layer, thereby preventing occurrence of shortage of powder in an arbitrary position within the molding space. For this reason, there is an excess powder material after formation of one layer, and this excess powder material is recovered and can be used again.

In addition, also the head section 34 moves in the +X direction in synchronization with the movement of the thin layer formation section 20, and discharges from the discharge nozzle 37e a binder of ultraviolet-ray hardening resin to the extended powder layer in accordance with a control signal from the drive control section 12. At this time, the drive control section 12 provides the head section 34 with a control signal in accordance with the shape data of cross section data (see FIG. 4), and thereby the binder is applied on the selected region to be molded.

In step S6, the thin layer of powder material is irradiated with ultraviolet rays by means of the ultraviolet irradiation section 39 which moves integrally with the head section 34. Consequently, the binder of ultraviolet-ray hardening resin applied to the thin layer of powder material is hardened. As a result, a bound body of powder material is generated for each powder layer, and the regions where the binder is not applied individually keep independent states.

Then, as thin layer formation section 20 reaches the position as shown in FIG. 5B, a binding operation of one layer is complete, which means completion of molding of one layer.

In step S7, the head section 34 is moved in the −X direction, and ink of each color is discharged from the discharge nozzles 37a to 37d to the bound body of powder material which is formed by hardening of the binder by the ultraviolet irradiation. At this time, the drive control section 12 gives a control signal to the head section 34 in accordance with coloring data of YCMW in cross section data (see FIG. 4), and thereby ink is applied for a region to be colored which is neighborhood of the surface of a three-dimensional molded article. In this way, it is possible to give a desired color on the three-dimensional molded article. In addition, in such a case, it is preferable to irradiate ultraviolet rays from the ultraviolet irradiation section 39 in order to assure hardening of an ultraviolet-ray hardening resin applied to the powder layer 82.

Generally, in order to perform coloring, three primary colors of Y, M, C are mixed, however, it is effective to discharge and mix a white binder in addition to the three primary colors in order to express gradation of a color. In general printers, since printing is realized by printing characters and images on white paper with ink, toner and the like, white is not necessary when the white color of the paper which is a base material is utilized, and theoretically gradation of an every color component can be expressed just using the three colors of Y, M, C. However, it becomes particularly effective to use a white binder when the color of powder which is a material of three-dimensional molding is not white.

On example of a manner of ink discharge in the case of expressing a gradation in effecting coloring on a three-dimensional molded article will be explained below.

Figure 6:
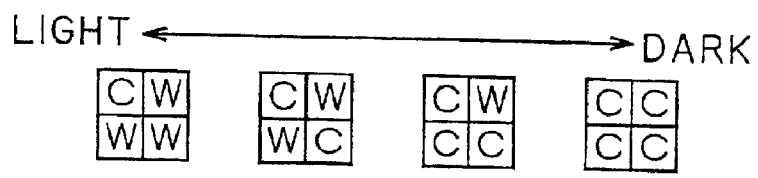
FIG. 6 is a view showing one example of a gradation expression with regard to cyan.

FIG. 6 is a view showing an example of gradation expression about cyan. A predetermined gray level transformation is conducted in the drive control section 12, and gradation data of multiple value included in the cross section data is converted into binary data every basis dot region (minimum rectangle of FIG. 6). This binary data will be information for ON/OFF control of each discharge nozzle 37a to 37d for discharging ink. When light cyan is intended to be expressed, cyan ink is discharged to one basis dot region in the 2×2 matrix arrangement, and white ink is discharged to other basis dot region. On the other hand, when dark cyan is intended to be expressed, cyan is discharged to the whole of a basic unit region. In the manner as described above, by changing the proportion of the cyan ink and the white ink with respect to the basic unit region, it is possible to adequately express the gradation from light cyan to dark cyan.

Figure 7:
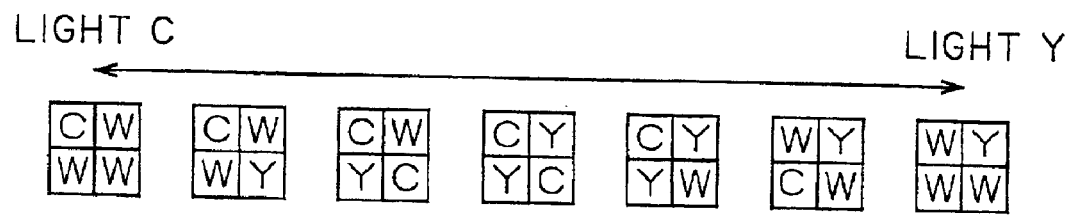
FIG. 7 is a view showing one example of expression changing from light cyan to light yellow.

FIG. 7 shows an example of expression changing from light cyan to light yellow. In FIG. 7, the left end shows a discharge pattern of C and W for expressing light cyan, and the right end shows a discharge pattern of Y and W for expressing light yellow. In the case of transiting from light cyan to light yellow through mixed colors of cyan and yellow, as shown in FIG. 7, the proportion of C and Y and W to be discharged in the basic unit region is gradually changed, whereby such a color transition can be expressed.

Figure 8B:
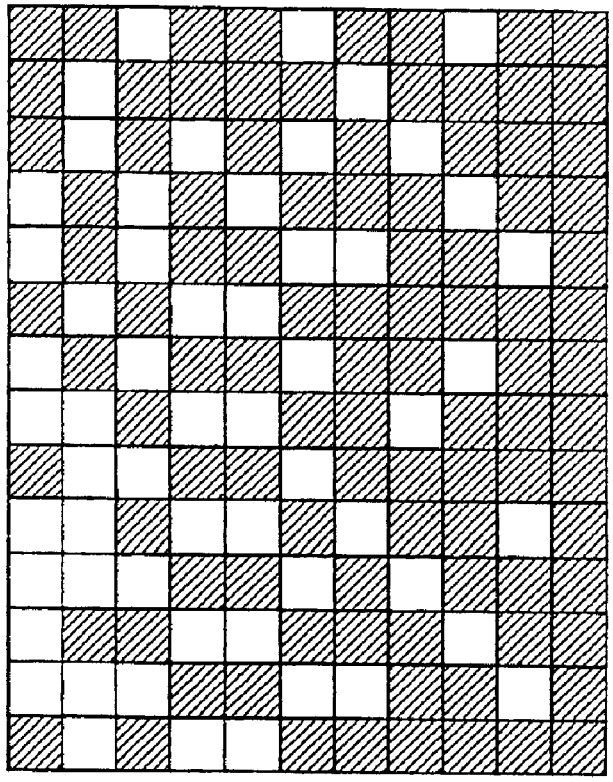
FIGS. 8A and 8B are view showing the state that a plurality of basic set regions for coloring gather.
Figure 8A:
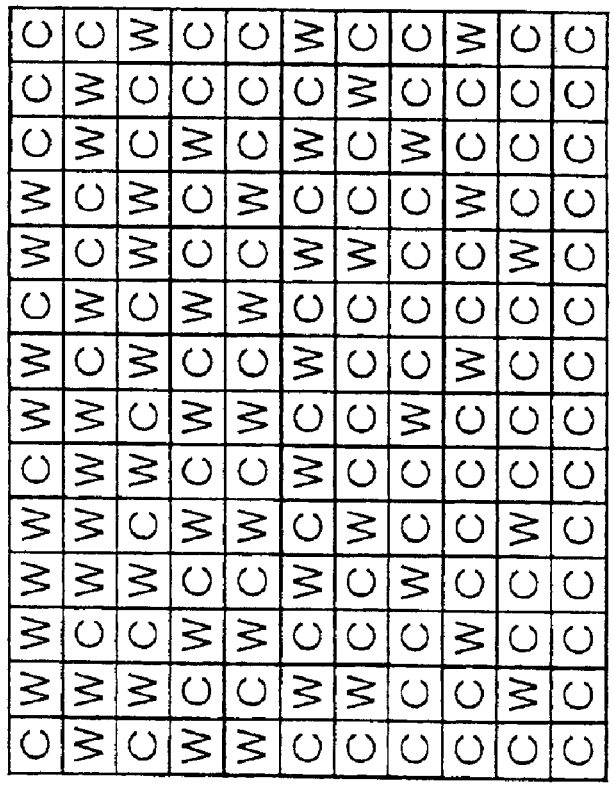

FIG. 8A and FIG. 8B show the state that a plurality of basic unit regions gathers for coloring as mentioned above. FIG. 8A shows a discharge pattern of C and W, and FIG. 8B concretely shows a coloring form expressed by the discharge patterns of FIG. 8A and FIG. 8B. As shown in FIGS. 8A and 8B, the drive control section 12 controls the discharge pattern, making it possible to accomplish coloring in the molding process of a three-dimensional molded article.

In step S8, whether molding of a three-dimensional molded article has completed is determined. And, if molding has not completed, an operation of forming a new powder bound body of the N+1 th layer on the Nth layer is executed. And, upon completion of molding of the three-dimensional molded article, each of independent powder materials to which the binder has not applied are separated, and then it becomes possible to take out a bound body (three-dimensional molded article) bound by the binder. The powder material not having bound may be collected and used as a powder material again.

In the manner as described above, by repeating the operation shown in FIGS. 5A to 5C for number of times corresponding to the number of lamination, a colored bound body for every layer is sequentially laminated on the stage 42, and finally a three dimensional molded article of the object to be molded is molded on the molding stage 42.

In the operation of the three-dimensional molding apparatus 100 as described above, since an ultraviolet-ray hardening resin which hardens by irradiation of ultraviolet ray is used as the binder, it is possible to shorten the molding time and thus generate the three-dimensional molded article in a short time. In addition, since hardening of the binder can be controlled by presence/absence of ultraviolet rays, by interrupting the ultraviolet rays at the discharge nozzle, fluidity of the binder can be ensured and hence blocking can be prevented.

Furthermore, in a conventional three-dimensional molding apparatus, since the operation of hardening the binder for each layer of the powder material was not conducted, the following problems arose.

(1) In the case where after applying a binder on the molding region for each layer of the powder material, ink is additionally applied for conducting coloring, since the ink is applied in the condition that the binder has not hardened, a bleed occurs, deteriorating the color reproducibility and resolution.

(2) Since the upper powder material layer is formed in the condition that the binder has not hardened, on the region where a display surface of the three-dimensional molded article is to appear, a powder material of unhardened region in the vicinity of that region come into adhesion, so that the shape accuracy and color reproducibility of the finished three dimensions molding article are deteriorated.

As for the above problems, since the three-dimensional molding apparatus 100 conducts coloring after irradiating each layer with ultraviolet rays and allowing the powder material to be bound, the color reproducibility or the like is improved.

<Second Preferred Embodiment>

Figure 9:
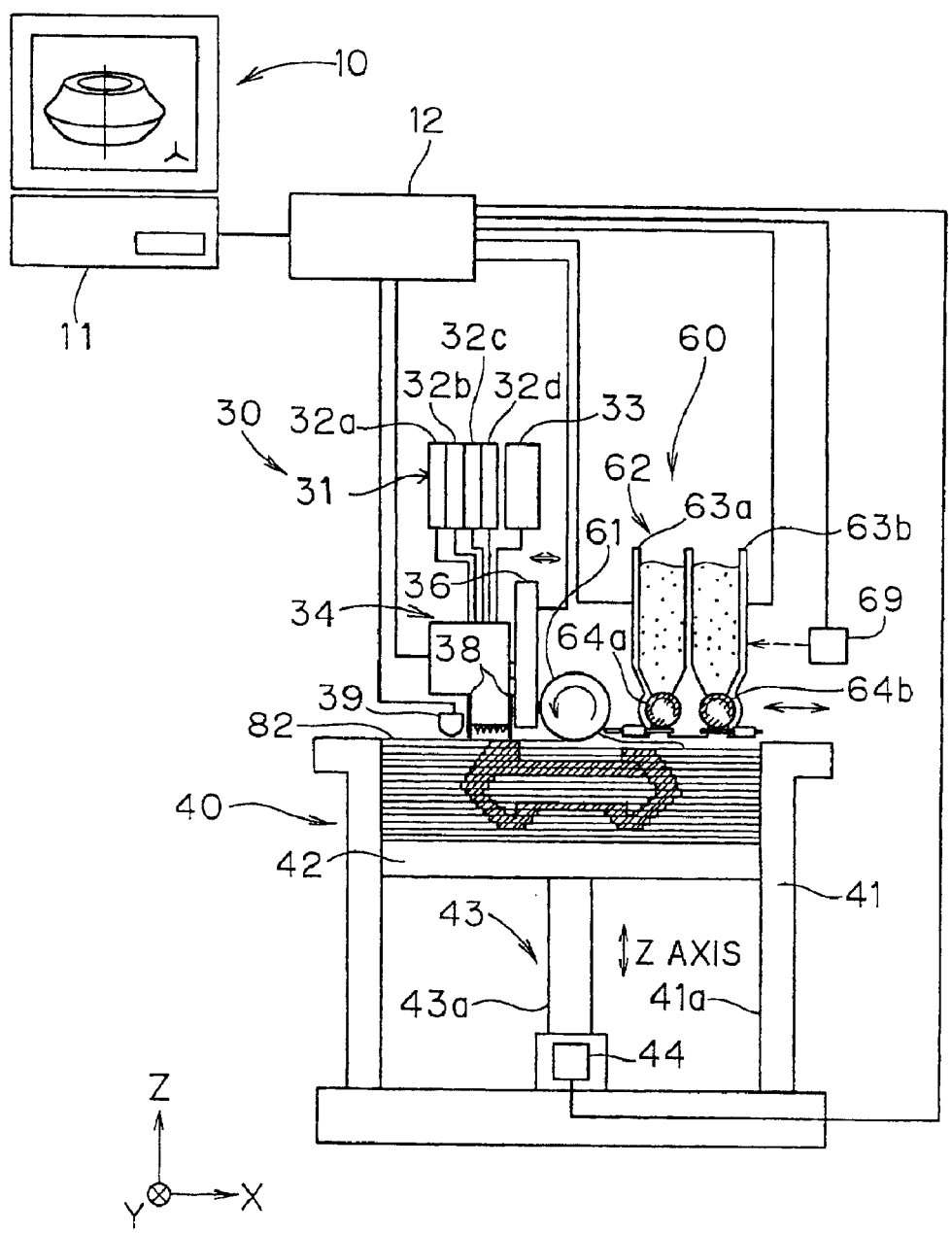
FIG. 9 is a view showing an essential configuration of a three-dimensional molding apparatus according to a second preferred embodiment of the present invention.

FIG. 9 is a view showing an essential configuration of a three-dimensional molding apparatus 100A according to a second preferred embodiment of the present invention.

The three-dimensional molding apparatus 100A has a similar configuration to that of the three-dimensional molding apparatus 100 according to the first preferred embodiment except that a thin layer formation section 60 differs from that. Configuration of the thin layer formation section 60 will be explained below.

The thin layer formation section 60 comprises, as same as the thin layer formation section 20 of the first preferred embodiment, an extension roller 61, a powder material feed mechanism 62 and a driving section 69. The thin layer formation section 60 is reciprocally movable in the X direction by means of a driving section 69. The extension roller 61 and the powder feed mechanism 62 extend in the Y direction and are so configured that they can achieve formation of thin layer of powder material in the molding section 40 by a single motion along the X direction by means of the driving section 69.

Figure 10A:
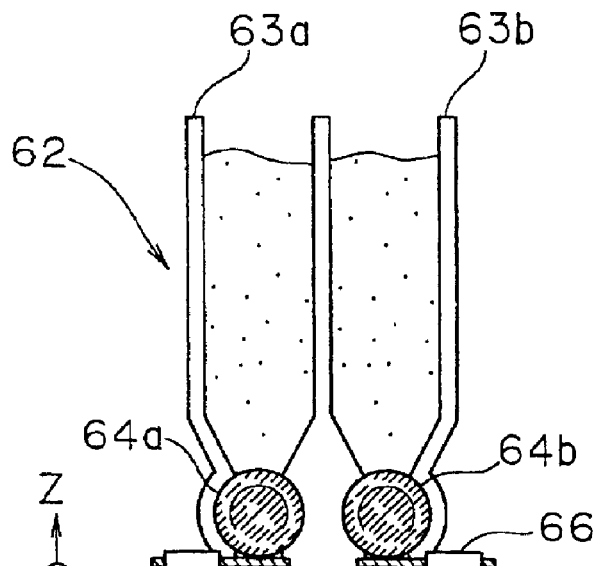
FIGS. 10A and 10B are views showing an essential configuration of a powder feed mechanism.
Figure 10B:
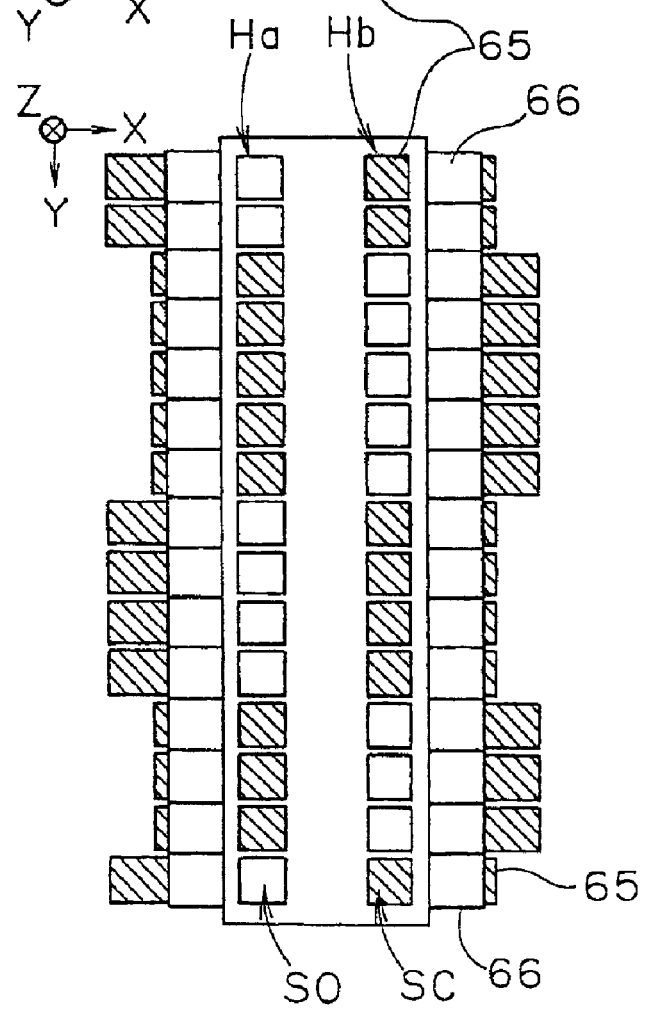

FIGS. 10A and 10B are views showing an essential configuration of the powder feed mechanism 62. FIG. 10A is a section view of the powder feed mechanism 62 in respect of XZ plane, and FIG. 10B shows the powder feed mechanism 62 viewed from bellow.

The upper side of the powder feed mechanism 62 has two powder containers 63a, 63b for accommodating different powder materials, and porous feed rollers 64a, 64b are provided on the bottom of the powder container 63a, 63b. In addition, the powder feed mechanism 62 has 30 shutters 65 and an actuator 66 for driving the shutters 65.

Each shutter 65 is changed over between the open state SO and the close state SC in accordance with an instruction from the drive control section 12. Controlling of close/open of the shutters 65 makes it possible to conduct formation of layers of powder material while supplying the two kinds of powder materials accommodated in the powder containers 63a, 63b selectively. These powder containers 63a, 63b accommodate, for example, two kinds of powder materials having different grain diameters.

<Operation of the Three-dimensional Molding Apparatus 100A>

The operation of the three-dimensional molding apparatus 100A is substantially equal to the operation shown in the flow chart of FIG. 3, however, an operation for forming a thin layer of powder material corresponding to step S5 is different.

In this operation for forming a thin layer, two kinds of powder materials accommodated in the powder containers 63a, 63b are supplied while moving the thin layer formation section 60 in the +X direction. Concretely, as shown in FIG. 10B, two kinds of powder materials are selectively supplied by making one of two openings Ha, Hb at the same Y-directional position in the powder feed mechanism 62 into the open state and the other into the close state.

Figure 11:
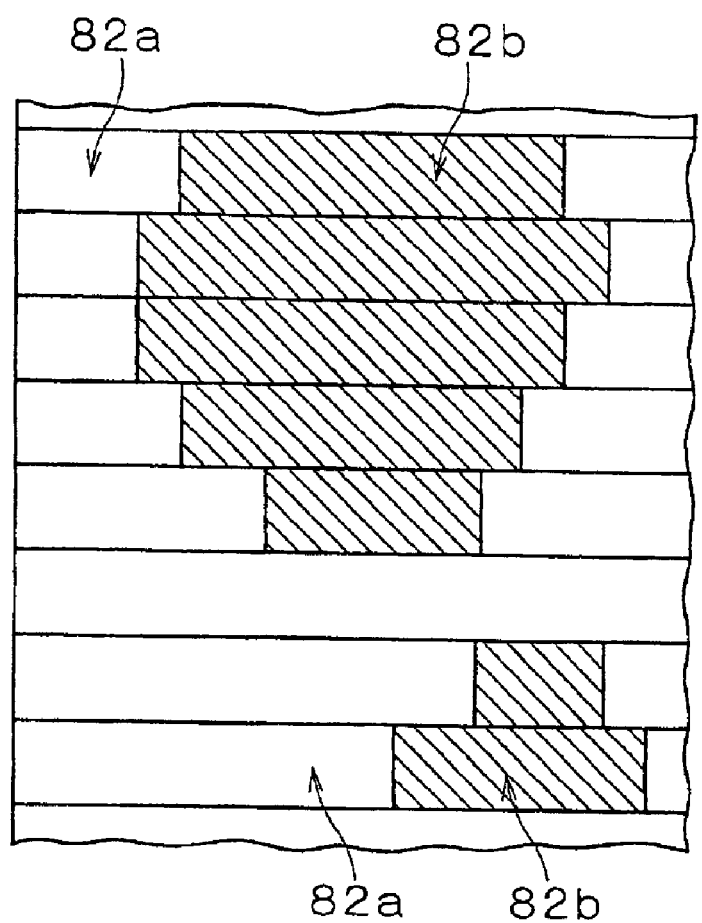
FIG. 11 is a view showing one example of a layer of powder material formed on the molding stage by the layer formation section.

FIG. 11 is a view showing an example of a layer of a powder material formed on the molding stage 42 by means of this thin layer formation section 60.

As shown in FIG. 11, a single powder layer is formed by using a powder material 82a in the powder container 63a and a powder material 82b in the powder container 63b (denoted by parallel diagonal lines). By forming the layer in this manner, surface roughness, strength or the like of a certain part of three-dimensional molded article can be different from those of other part, variations of three-dimensional molding will increase.

As a consequence of the above-described operation of the three-dimensional molding apparatus 100A, an effect equivalent to that of the three-dimensional molding apparatus 100 according to the first preferred embodiment can be achieved. Furthermore, since plural kinds of powder materials can be used for three-dimensional molding, flexibility of molding improves.

<Third Preferred Embodiment>

A three-dimensional molding apparatus 100B according to a third preferred embodiment of the present invention has a similar configuration to that of the three-dimensional molding apparatus 100 of the first preferred embodiment except that configuration of the binder applying section 30B is different. The configuration of the binder applying section 30B will be explained below.

Figure 12:
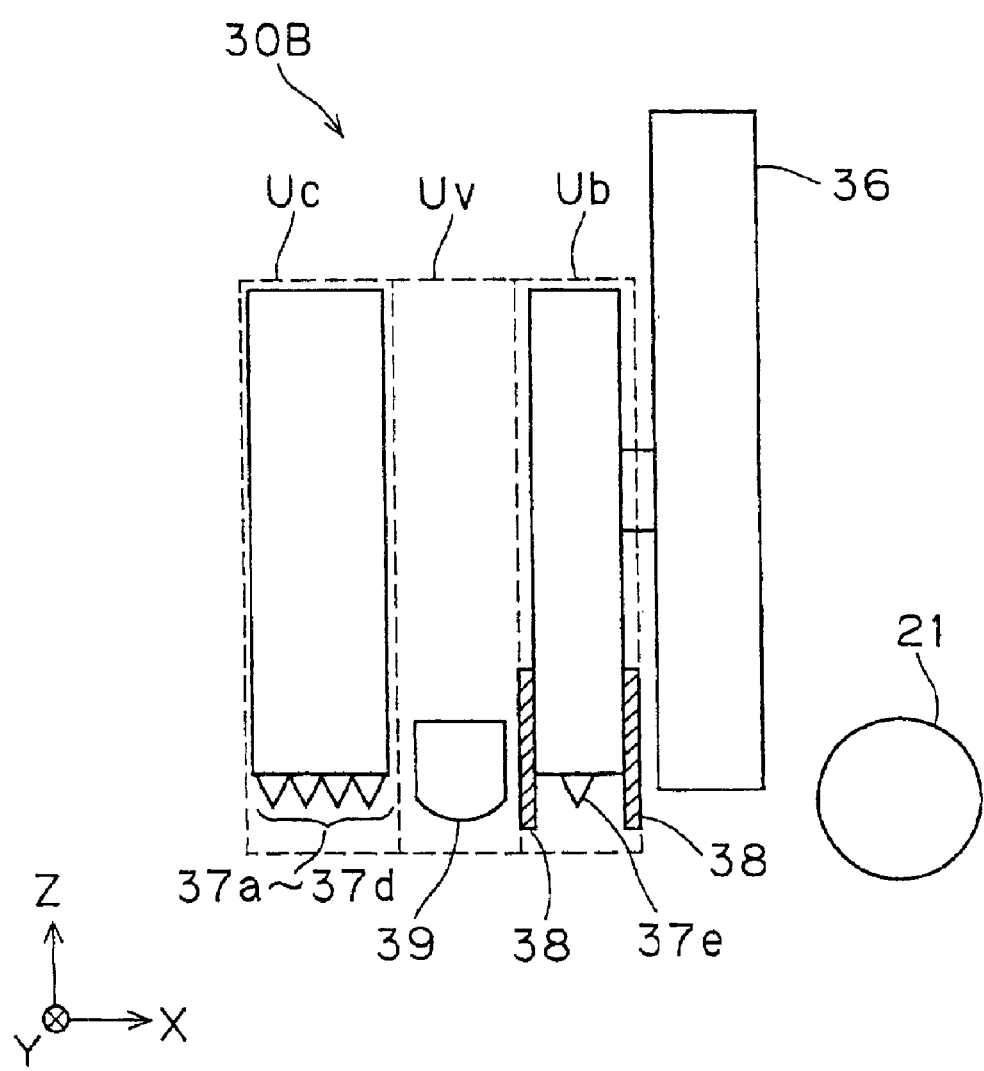
FIG. 12 is a view showing an essential configuration of a binder applying section according to a third preferred embodiment of the present invention.

FIG. 12 is a view showing an essential configuration of the binder applying section 30B.

In the binder applying section 30B, the ultraviolet irradiation section 39 is placed between the discharge nozzles 37a to 37d for discharging the respective color ink and the discharge nozzle 37e for discharging a binder of ultraviolet-ray hardening resin.

That is, the binder discharge unit Ub having the discharge nozzle 37e and functioning as supply means is placed between the extension roller 21 functioning as layer formation means and the ultraviolet irradiation unit Uv functioning as radiation means.

<Operation of the Three-dimensional Molding Apparatus 100B>

Operation of the three-dimensional molding apparatus 100B is similar to the operation shown in the flow chart of FIG. 3 except that steps S5–S7 are executed in parallel with the powder layer.

Figure 13A:
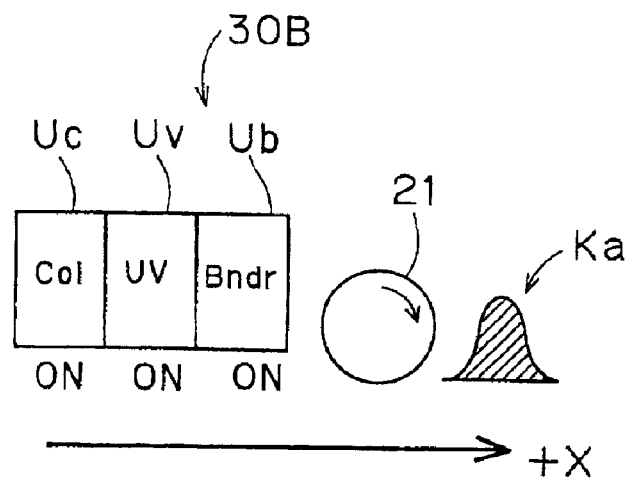
FIGS. 13A and 13B are views for explaining outlines of operation of the three-dimensional molding apparatus.
Figure 13B:
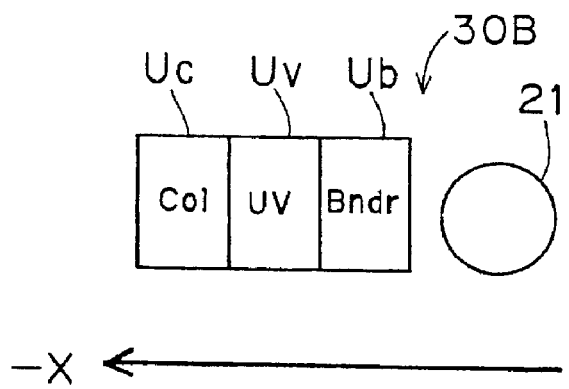

FIG. 13A and FIG. 13B are views showing a general outline of the operation of the molding apparatus 100B. FIG. 13A shows an operation in the outward (+X direction) passage of the binder applying section 30B and FIG. 13B shows an operation in the homeward (−X direction) of the binder applying section 30B.

As shown in FIG. 13A, the extension roller 21 is moved in the +X direction, as well as the color ink discharge unit Uc, the ultraviolet irradiation unit Uv and the binder discharge unit Ub are integrally moved in the +X direction.

In this context, with respect to the powder mass Ka fed from the powder feed mechanism 20, a binder of ultraviolet-ray hardening resin is discharged from the binder discharge unit Ub while forming a layer of powder material by means of the extension roller 21, as well as the layer of powder material is irradiated with ultraviolet rays while secondarily scanning the ultraviolet irradiation unit Uv in the +X direction. Furthermore, different colors of ink is discharged from the color ink discharge unit Uc.

That is, by activating (turning ON) the binder discharge unit Ub, the ultraviolet irradiation unit Uv and the color ink discharge unit Uc in parallel with the activation of the extension roller 21, it becomes possible to generate a bound body of the powder material in the outward passage, as well as to conduct coloring thereon.

Then, as shown in FIG. 13B, in the homeward passage of the −X direction, an operation of returning to the initial position at a movement speed which is larger than the movement speed of the outward passage is executed without activating the binder discharge unit Ub, the ultraviolet irradiation unit Uv and the color ink discharge unit Uc.

By repeating the operation as described above, a bound body is sequentially formed for every layer of powder material, and by separating the powder material that has not been bound by the binder from the powder material, a three-dimensional molded article can be generated.

According to the operation of the above-mentioned three-dimensional molding apparatus 100B as described above, the equivalent effect of that of the three-dimensional molding apparatus 100 of the first preferred embodiment can be achieved. In addition, since the molding and coloring operations are executed in the outward passage and these operations are omitted in homeward passage so as to move at high speed, it is possible to shorten the three-dimensional molding time.

Figure 14A:
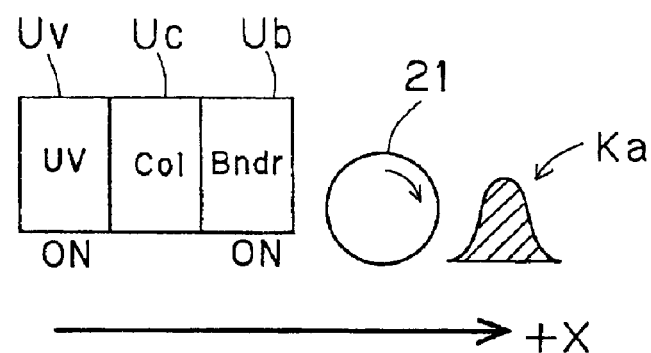
FIGS. 14A and 14B are views for explaining other operation in three-dimensional molding.
Figure 14B:
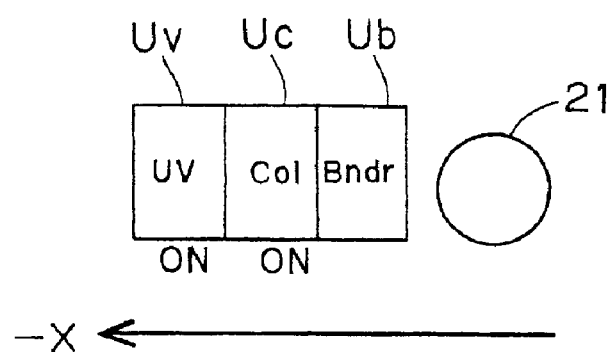

Arrangement of each unit may be configured as shown in FIG. 14A and FIG. 14B without being limited to the arrangement of the three-dimensional molding apparatus 100B.

In the configuration shown in FIG. 14A and FIG. 14B, the binder discharge unit Ub, the color ink discharge unit Uc and the ultraviolet irradiation unit Uv are disposed in this sequence from the extension roller 21. In this context, in the outward passage, a binder is discharged to the powder layer by activating the extension roller 21 and the binder discharge unit Ub as shown in FIG. 14A, and the ultraviolet irradiation unit Uv is activated to irradiate with the ultraviolet rays. On the other hand, in the homeward passage, as shown in FIG. 14B, the ultraviolet irradiation unit Uv is activated to perform the second ultraviolet irradiation on the powder layer, and the color ink discharge unit Uc is activated to discharge different colors of ink.

As a consequent of the above operation, since the ultraviolet irradiation can be conducted twice before applying ink on the powder material, it is possible to harden the binder of ultraviolet-ray hardening resin securely and to carry out appropriate coloring. Furthermore, since the binder discharge unit Ub and the ultraviolet irradiation unit Uv are not adjacent to each other, blocking caused leakage of ultraviolet rays from the ultraviolet irradiation unit Uv is prevented from occurring in the discharge nozzle 37e of the binder discharge unit Ub.

Figure 15A:
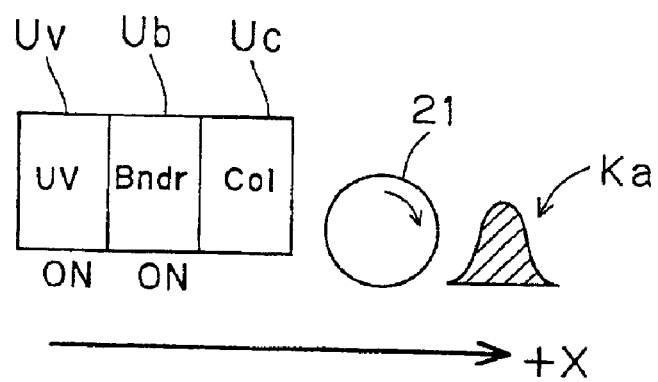
FIGS. 15A and 15B are views for explaining other operation in three-dimensional molding.
Figure 15B:
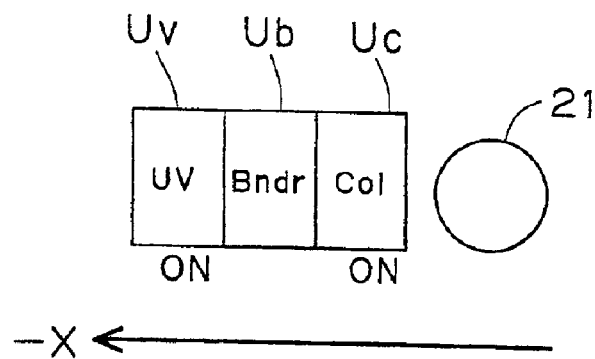

Arrangement of each unit may be configured as shown in FIG. 15A and FIG. 15B.

In the configuration shown in FIG. 15A and FIG. 15B, the color ink discharge unit Uc, the binder discharge unit Ub and the ultraviolet irradiation unit Uv are disposed in this sequence from the extension roller 21. In this context, in the outward passage, a binder is discharged to the powder layer by activating the extension roller 21 and the binder discharge unit Ub as shown in FIG. 15A, and the ultraviolet irradiation unit Uv is activated to irradiate with the ultraviolet rays. On the other hand, in the homeward passage, the ultraviolet irradiation unit Uv is activated to perform the second ultraviolet irradiation on the powder layer, and the color ink discharge unit Uc is activated to discharge different colors of ink.

As a consequent of the above operation, since the ultraviolet irradiation can be conducted twice before applying ink on the powder material, it is possible to harden the binder of ultraviolet-ray hardening resin securely and to carry out appropriate coloring. Furthermore, since the binder discharge unit Ub and the ultraviolet irradiation unit Uv are adjacent with each other, the time from application of the binder onto the powder layer to irradiation with ultraviolet rays can be shortened. As a result of this, molding with high accuracy and high fineness can be achieved by preventing a bleed of the binder in the powder layer.

Figure 16A:
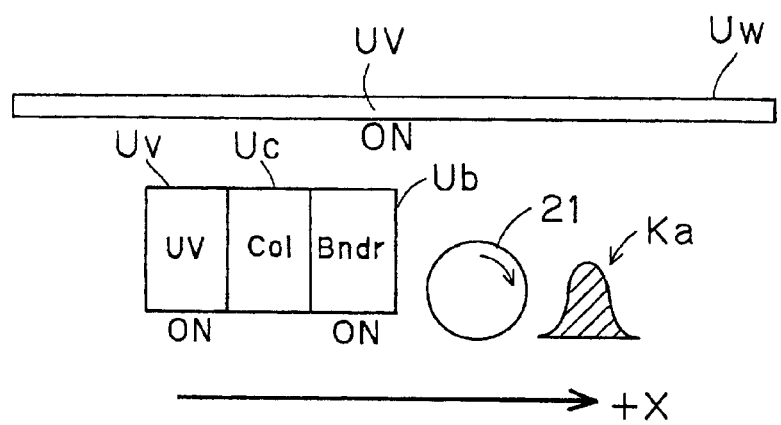
FIGS. 16A and 16B are views for explaining other operation in three-dimensional molding.
Figure 16B:
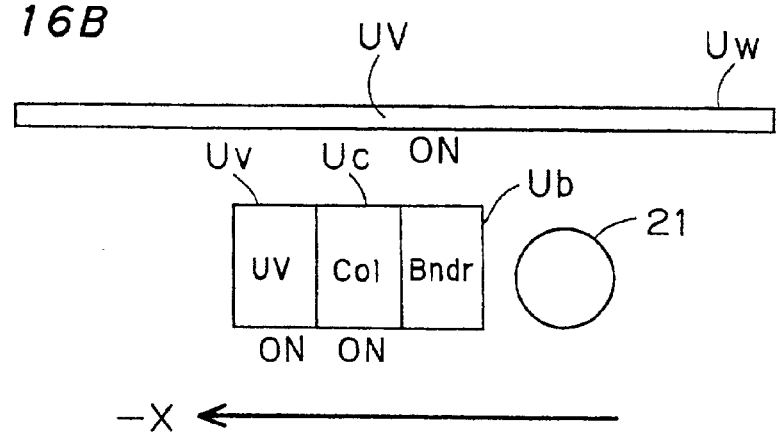

Furthermore, arrangement of each unit may be configured as shown in FIG. 16A and FIG. 16B.

In the configuration as shown in FIG. 16A and 16B, as is same in FIG. 14A and FIG. 14B, the binder discharge unit Ub, the color ink discharge unit Uc and the ultraviolet irradiation unit Uv are disposed in this sequence from the extension roller 21. Furthermore, above each unit Ub, Uc, Uv, a stationary ultraviolet irradiation unit Uv for irradiating the whole molding area, or the whole surface of the powder layer on the molding stage 42 is disposed. In this context, in the outward passage, a binder is discharged to the powder layer by activating the extension roller 21 and the binder discharge unit Ub as shown in FIG. 16A, the ultraviolet irradiation unit Uv is activated to irradiate with the ultraviolet rays, and the whole molding area is irradiated with the ultraviolet rays from the stationary ultraviolet irradiation unit Uw. On the other hand, in the homeward passage, as shown in FIG. 16B, the ultraviolet irradiation unit Uv is activated to perform the second ultraviolet irradiation on the powder layer, the color ink discharge unit Uc is activated to discharge different colors of ink, and the whole molding area is irradiated with the ultraviolet rays from the stationary ultraviolet irradiation unit Uw.

With the above operation, an effect equivalent to that of FIG. 14A and FIG. 14B can be achieved, and in addition, since the ultraviolet irradiation from the stationary ultraviolet irradiation unit Uw is auxiliarily added to the ultraviolet irradiation from the ultraviolet irradiation unit Uv, the amount of irradiation of ultraviolet ray increases, allowing the binder to be hardened more securely.

<Fourth Preferred Embodiment>

Figure 17:
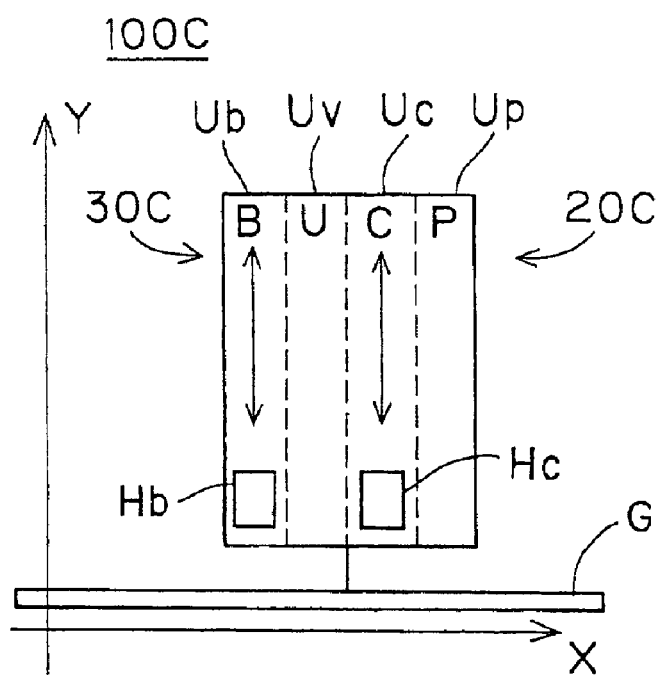
FIG. 17 is a view showing an essential configuration of a layer formation section and a binder applying section according to a fourth preferred embodiment of the present invention.

The three-dimensional molding apparatus 100C according to a fourth preferred embodiment of the present invention has a configuration similar to that of the three-dimensional molding apparatus 100 of the first preferred embodiment except that the configurations of a thin layer formation section 20C and a binder applying section 30C differ. Configurations of the thin layer formation section 20C and the binder applying section 30C will be explained below. As shown in FIG. 17, the mechanism including the extension roller 21 of the thin layer formation section 20C is refers to as an extension unit Up.

As shown in FIG. 17, the binder applying section 30C is so configured that the color ink discharge unit Uc, the ultraviolet irradiation unit Uv and the binder discharge unit Ub are disposed in this sequence from the extension unit Up. This arrangement is mirror symmetric to the arrangement of each unit of the binder applying section 30B of the third preferred embodiment with respect to the X direction, so that molding and coloring in the homeward passage in the -X direction can be achieved. And, each of the extension unit Up, the color ink discharge unit Uc, the ultraviolet irradiation unit Uv and the binder discharge unit Ub are disposed on one base plate functioning as holding means to be held in integral manner, and the ultraviolet irradiation unit Uv is disposed between the extension unit Up and the binder discharge unit Ub. Furthermore, each of the unit Uv, Uc, Ub and Up is integrally connected to the guide G extending in the X direction to be enabled to move in the X direction along the guide G.

The binder discharge unit Ub and the color ink discharge unit Uc are provided with discharge heads Hb and Hc which can move (execute primary scan) in the Y direction. In addition to performing primary scanning, these discharge heads Hb and Hc can apply a binder and color ink on a desired region in the powder material layer by performing secondary scanning along the guide G.

<Operation of the Three-dimensional Molding Apparatus 100C>

The operation of the three-dimensional molding apparatus 100C is almost the same as that of the operation shown in the flow chart of FIG. 3, however, since the extension unit Up, the color ink discharge unit Uc, the ultraviolet irradiation unit Uv and the binder discharge unit Ub move in integral manner in the X direction, the following considerations are necessary.

The units Ub and Uc having the discharge heads Hb and Hc, respectively cannot perform secondary scanning in the X direction unless the primary scanning in the Y direction has completed, so that movement in the X direction can not be made intermittently, or continuously and smoothly. This contradicts to the fact that movement in the X direction of the extension unit Up is preferably done in a continuous manner from the view point of extending the powder material uniformly.

In view of the above, in the outward passage moving in the +X direction, only the extension unit Up is activated with respect to the powder material supplied in front of the extension unit Up, thereby forming a uniform powder layer. On the other hand, in the homeward passage moving in the -X direction, binder application, ultraviolet irradiation and coloring are carried out while activating the color ink discharge unit Uc, the ultraviolet irradiation unit Uv and the binder discharge unit Ub other than the extension unit Up.

That is, in the outward passage, after forming a powder material layer by activating the extension unit Up, the binder supply unit and the ultraviolet irradiation unit are activated to form a bound body related to the powder material layer.

In the above three-dimensional molding apparatus 100C, since each of the units Ub, Uv, Uc, Up is arranged in integral manner, it is possible to simplify the configuration of the apparatus, and additionally, since the operation of forming a thin layer of powder material can be carried out independently of other operations, it is possible to form the powder layer appropriately. Furthermore, the above configuration of the three-dimensional molding apparatus 100C can be applied to powder feeding from lower position in which a powder material is fed by being pressed upward from the interior or the molding section 40, as well as to powder feeding from upper position by the powder feed mechanism 22 as shown in FIG. 1.

Figure 18:
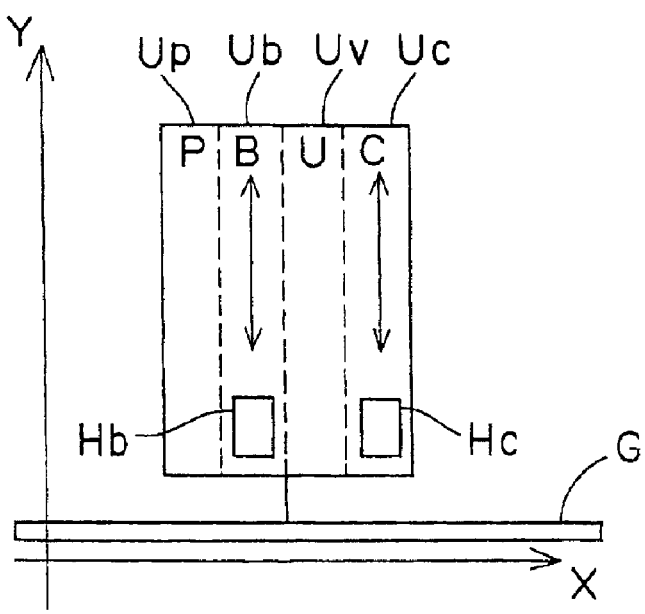
FIG. 18 is a view showing other configurations in the thin layer formation section and the binder applying section.

The unit arrangement as shown in FIG. 18 may be used without limited to the above configuration of the three-dimensional molding apparatus 100C.

In this context, as shown in FIG. 18, the binder discharge unit Ub, the ultraviolet irradiation unit Uv and the color ink discharge unit Uc are disposed in this sequence from the extension unit Up. And, as is the case of the three-dimensional molding unit 100C, each of the extension unit Up, binder discharge unit Ub, the ultraviolet irradiation unit Uv and the color ink discharge unit Uc are disposed and held in integral manner on one base plate functioning as holding means, and the binder discharge unit Ub is disposed between the extension unit Up and the ultraviolet irradiation unit Uv. Furthermore, each of the unit Uv, Uc, Ub and Up is integrally connected to the guide G extending in the X direction to be enabled to move in the X direction along the guide G.

In the apparatus as shown in FIG. 18, as is the case of the three-dimensional molding apparatus 100C, in the outward passage (+X direction), only the extension unit Up is activated with respect to the powder material supplied in front of the extension unit Up, thereby forming a uniform powder layer. On the other hand, in the homeward passage (−X direction), binder application, ultraviolet irradiation and coloring are carried out while activating the color ink discharge unit Uc, the ultraviolet irradiation unit Uv and the binder discharge unit Ub other than the extension unit Up. As a result of this, an effect as same as that of the above three-dimensional molding apparatus 100C can be achieved. As for the powder feed from upper position, since the mass of the fed powder material passes under the binder discharge unit Ub and the color ink discharge unit Uc prior to the extension unit Up in the outward passage, it is necessary to be careful so that the uppermost end of the mass of the powder material will not come into contact with the lowermost ends of the binder discharge unit Ub and the color ink discharge unit Uc.

Figure 19:
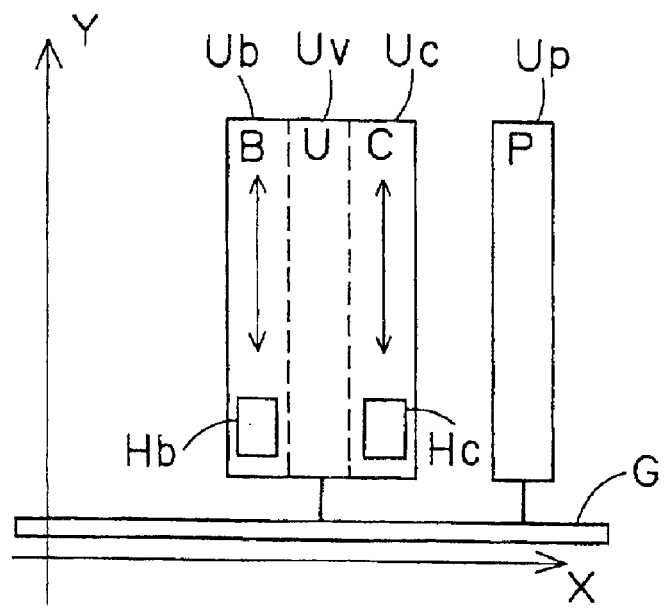
FIG. 19 is a view showing other configurations in the thin layer formation section and the binder applying section.
Figure 20:
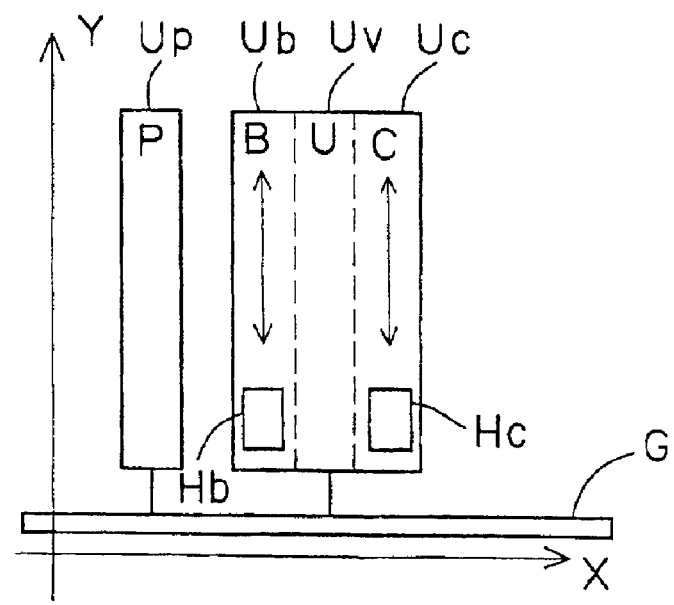
FIG. 20 is a view showing other configurations in the thin layer formation section and the binder applying section.

Furthermore, it is not necessary to form each unit as an integral unit as is in the three-dimensional molding apparatus 100C, and the extension unit Up and the binder applying section may be separated from each other as shown in FIG. 19 and FIG. 20. That is, in this configuration, the binder discharge unit Ub, the ultraviolet irradiation unit Uv and the color ink discharge unit Uc may be disposed on a single plate, while providing the extension unit Up separately. In such a case, the weight of the binder applying section can be reduced, so that faster movement in the X direction can be realized. Further, since the extension unit Up can move independently of the units Ub, Uv, Uc of the binder applying section, continuous and smooth movement of the extension unit is realized independently of the intermittent movement of the binder applying section. As a result of this, operation of binder application and the like can be conducted in addition to the formation of the powder layer in the outward passage.

<Fifth Preferred Embodiment>

A three-dimensional molding apparatus 100D according to a fifth preferred embodiment of the present invention has a configuration similar to that of the three-dimensional molding apparatus 100C according to the fourth preferred embodiment, except that configurations of a thin layer formation section 20D and a binder applying section 30D are differ from those of the three-dimensional molding apparatus 100C. That is, in the three-dimensional molding apparatus 100C according to the fourth preferred embodiment, each unit Ub, Uv, Uc, Up is configured into an integral piece, whereas in the three-dimensional molding apparatus 100D according to the fifth preferred embodiment, each unit Ub, Uv, Uc, Up is separated from each other.

Figure 21:
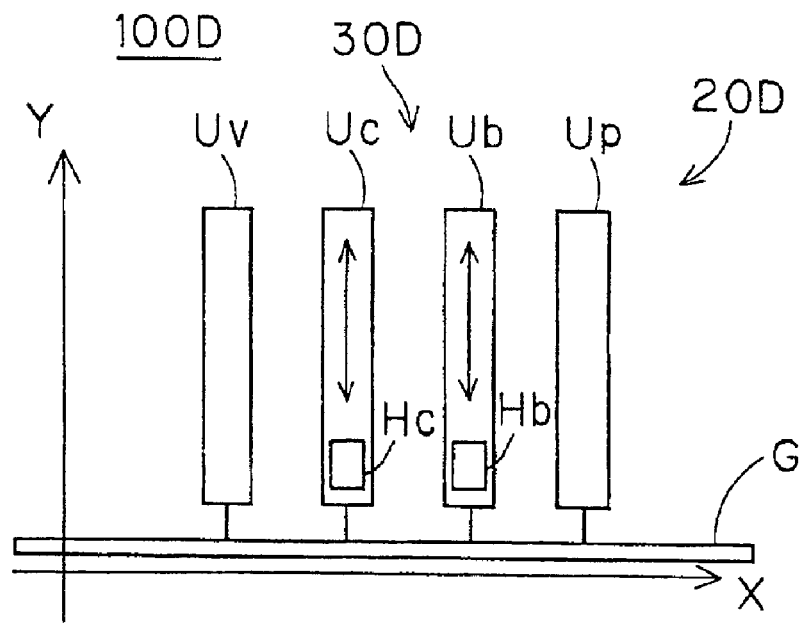
FIG. 21 is a view showing an essential configuration of a layer formation section and a binder applying section according to a fifth preferred embodiment of the present invention.

In the binder applying section 30D, as shown in FIG. 21, the ultraviolet irradiation unit Uv, color ink discharge unit Uc and the binder discharge unit Ub and the extension unit Up are arranged in this sequence. And each of the extension unit Up, the binder discharge unit Ub, the color ink discharge unit Uc, and the ultraviolet irradiation unit Uv are connected to the guide G extending in the X direction. Along this guide G, each unit Uv, Uc, Ub, Up is independently movable in the X direction.

The binder discharge unit Ub and the color ink discharge unit Uc are provided with discharge heads Hb, Hc which can move (primary scan) in the Y direction.

The operation of the three-dimensional molding apparatus 100D is different from the operation of the three-dimensional molding apparatus 100C, and since each unit Uv, Uc, Ub, Up can move independently of each other in the X direction, it becomes unnecessary to conduct only formation of the thin layer by activating the extension unit in the outward passage. That is, in the outward passage (+X direction), for example, a bound body is formed in the powder layer by activating the extension unit Up, the binder discharge unit Ub and the ultraviolet irradiation unit, while in the homeward passage (−X direction), the color ink discharge unit Uc is activated, thereby accomplishing coloring.

With the operation of the three-dimensional molding apparatus 100D as described above, it is possible to appropriately generate a three-dimensional molded article as is the case of the foregoing preferred embodiments. Furthermore, since each unit can move independently of each other, flexibility in molding operation and coloring operation improves.

Figure 22:
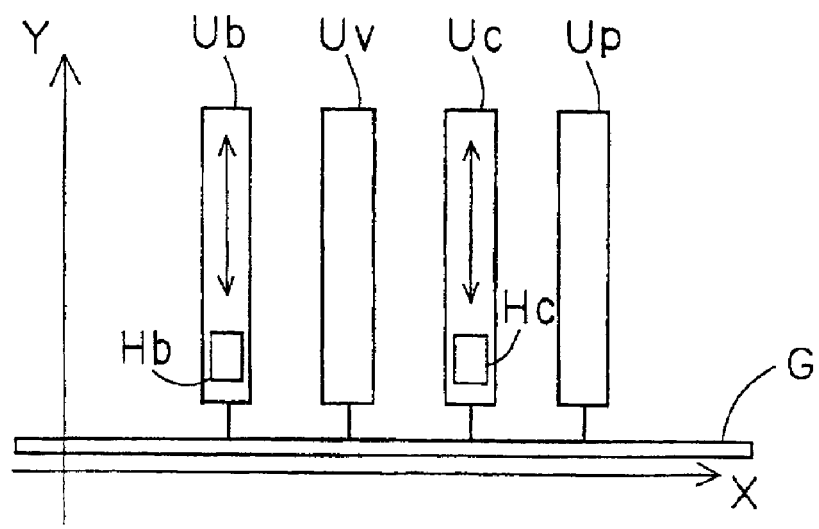
FIG. 22 is a view showing other configurations in the thin layer formation section and the binder applying section.

A configuration as shown in FIG. 22 is also possible without being limited to the configuration of the three-dimensional molding apparatus 100D.

In the configuration shown in FIG. 22, the binder discharge unit Ub, the ultraviolet irradiation unit Uv, the color ink discharge unit Uc, an the extension unit Up are arranged in this sequence, each of which being connected with the guide G. And, as is the case of the three-dimensional molding apparatus 100D, since each unit is movable independently of each other, flexibility of molding operation and coloring operation improves.

In addition, it is not necessary that all of the units are separated from each other as is in the three-dimensional molding apparatus 100D, and as shown in FIG. 23, the molding apparatus may have a binder/color ink discharge unit Ubc which incorporates the binder discharge unit Ub and a color ink discharge unit Uc.

This binder/color ink discharge unit Ubc has a discharge head Hbc which unifies the binder discharge head Hb and the color ink discharge head Hc in the three-dimensional molding apparatus 100D.

Figure 24:
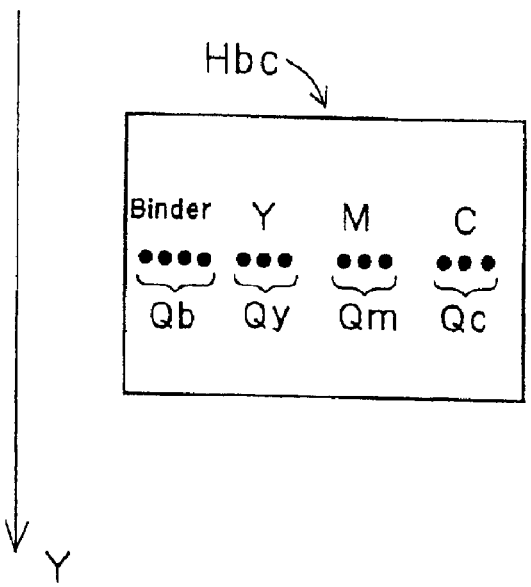
FIG. 24 is a plan view showing an essential configuration of the discharge head.

FIG. 24 shows a plan view showing an essential configuration of the discharge head Hbc.

The discharge head Hbc is so configured that a binder discharge port part Qb having a plurality of discharge ports, a Y ink discharge port part Qy, an M ink discharge port part Qm, a C ink discharge port part Qc having a plurality of discharge ports are arranged in parallel with respect to the Y direction.

With such a configuration of the discharge head Hbc, it is possible to simplify the driving mechanism for primarily scanning the discharge head in the Y direction.

Figure 25:
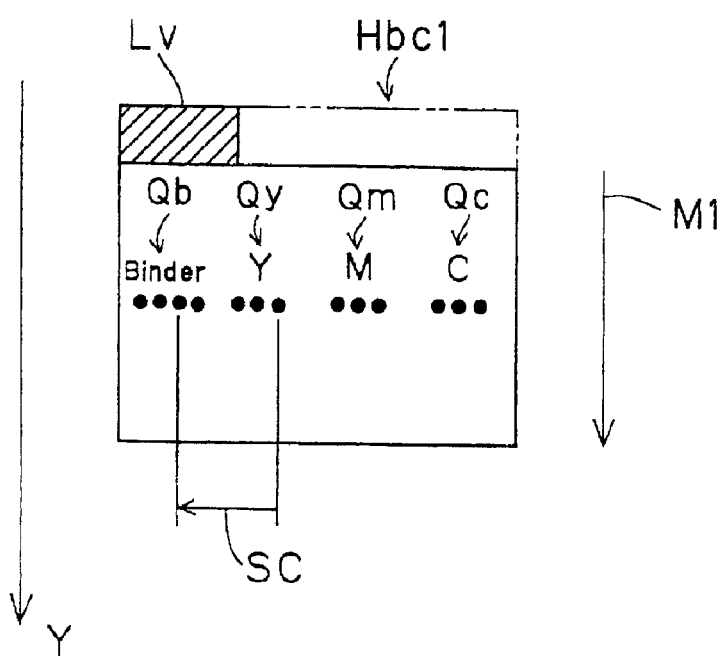
FIG. 25 is a plan view showing an essential configuration of the discharge head.

In addition, as for the discharge head, those having a light source Lv of ultraviolet rays using a lamp or an LED can be used as is the discharge head Hbc1 shown in FIG. 25. In this case, a binder is discharged from the binder discharge port part Qb while moving the discharge head Hbc1 in the direction M1 (+Y direction), and directly after that, ultraviolet rays can be emitted from the light source Lv. As a result of this, primary scanning by the light source Lv can be achieved, and the additional movement in the X direction of the binder/color ink discharge unit Ubc makes it possible to irradiate the whole surface of the powder layer with ultraviolet rays from the light source Lv. In this context, upon completion of the primary scanning, the discharge head Hbc1 is moved by a scanning width Sc of the X direction. As for the length of the light source Lv, it can be elongated to the imaginary line shown in FIG. 25.

Figure 26:
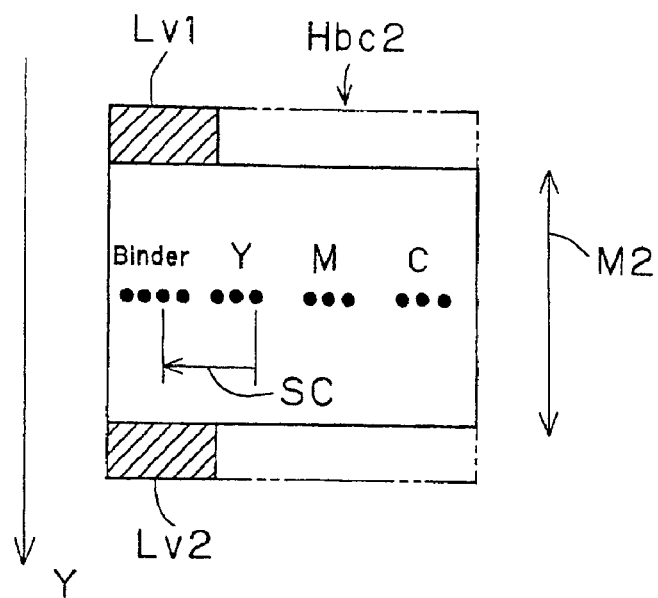
FIG. 26 is a plan view showing an essential configuration of the discharge head.

Also, the discharge head may have two light sources of ultraviolet ray Lv1, Lv2 as is a discharge head Hbc2 shown in FIG. 26. These light sources Lv1, Lv2 are disposed on either side with the binder discharge port part Qb being interposed therebetween. In this case, application of binder and irradiation of ultraviolet rays can be carried out while moving the discharge head Hbc2 in the bi-direction M2. In other words, in the outward passage, ultraviolet rays are emitted from the light source Lv1 while discharging the binder from the binder discharge port part Qb, whereas in the homeward passage, ultraviolet rays are emitted from the light source Lv2 while discharging the binder.

Figure 27:
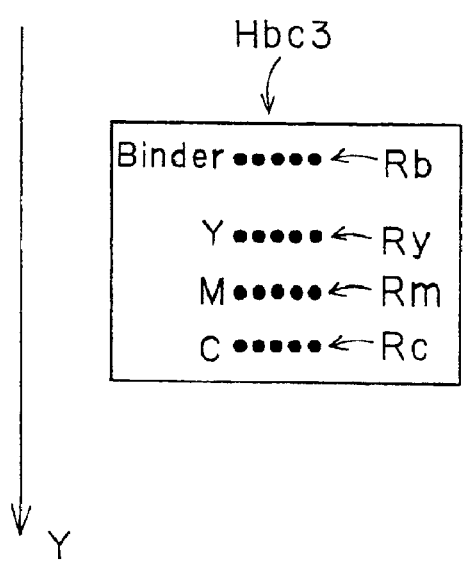
FIG. 27 is a plan view showing an essential configuration of the discharge head.
Figure 28:
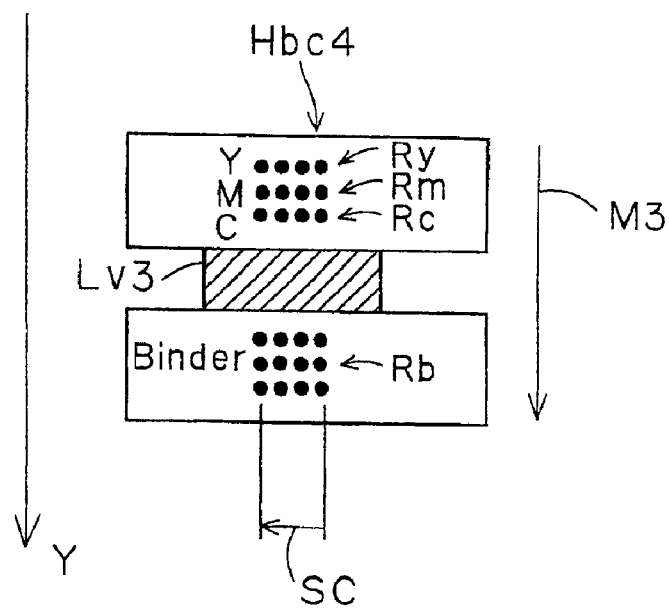
FIG. 28 is a plan view showing an essential configuration of the discharge head.

Furthermore, as for the discharge head, serial arrangement of port parts as is a discharge head Hbc3 shown in FIG. 27 can be used in place of the parallel arrangement of discharge port parts as shown in FIG. 24.

The discharge head Hbc3 is so configured that a binder discharge port part Rb having a plurality of discharge ports, a Y ink discharge port part Ry, an M ink discharge port part Rm, a C ink discharge port part Rc having a plurality of discharge ports are arranged in parallel with respect to the Y direction. Also in such a configuration of the discharge head Hbc3, it is possible to simplify the driving mechanism that enables the discharge head Hbc for discharging the binder and the color ink to carry out primary scanning in the Y direction.

Furthermore, in the discharge head Hbc3, a configuration of discharge head Hbc4 in which a light source of ultraviolet ray Lv3 is interposed between the binder discharge port part Rb and the Y ink discharge port part Ry, the M ink discharge port part Rm and the C ink discharge port part Rc. In this case, a binder is discharged from the binder discharge port part Rb while moving the discharge head Hbc4 in the direction M3 (+Y direction) and directly after that ultraviolet rays can be emitted from the light source Lv3. And after completion of the primary scanning, a secondary scan in which the discharge head Hbc1 is moved by the scan width Sc in the X direction.

Figure 29:
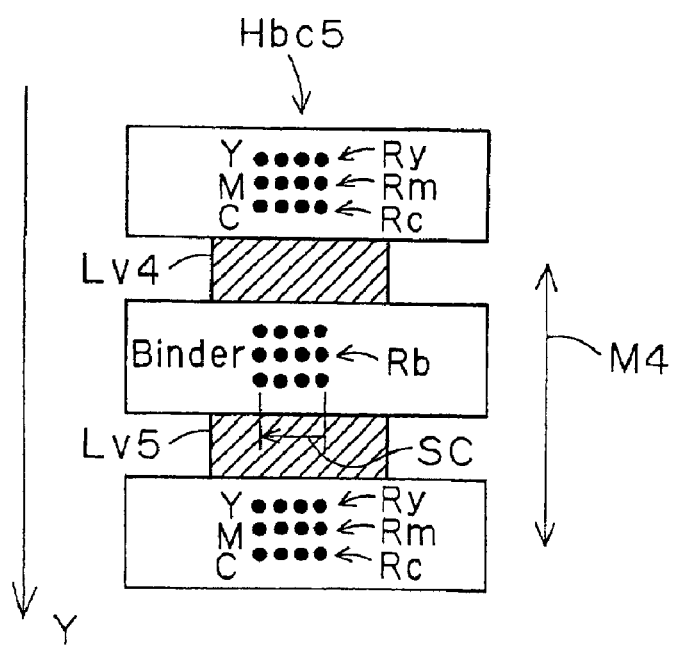
FIG. 29 is a plan view showing an essential configuration of the discharge head.
Figure 30:
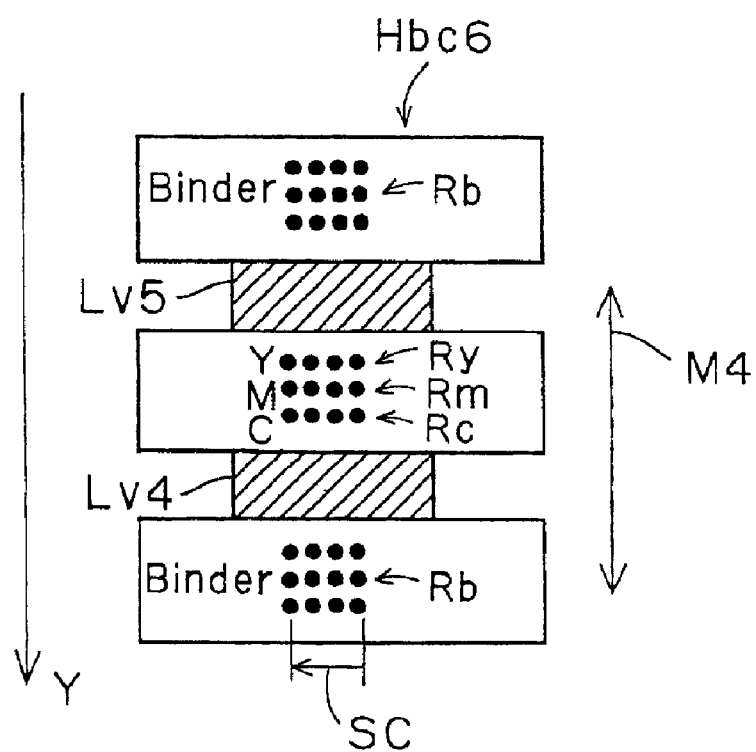
FIG. 30 is a plan view showing an essential configuration of the discharge head.

Furthermore, as for the discharge head, the discharge head may have two light sources of ultraviolet rays Lv4, Lv5 as is a discharge head Hbc5 shown in FIG. 29 and a discharge head Hbc6 shown in FIG. 30. Each of these light sources Lv4, Lv5 is interposed between the binder discharge port part Rb and the ink discharge port parts Ry, Rm, Rc. In this case, as is the case of the discharge head Hbc2 as described above, application of binder and irradiation of ultraviolet ray can be conducted while moving the discharge heads Hbc5, Hbc6 in the bi-direction M4.

Figure 31A:
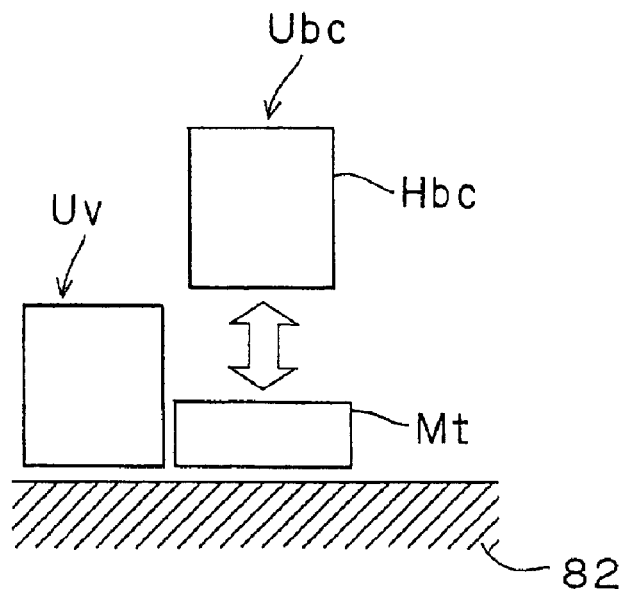
FIG. 31 is a view illustrating a configuration of a discharge head.
Figure 31B:
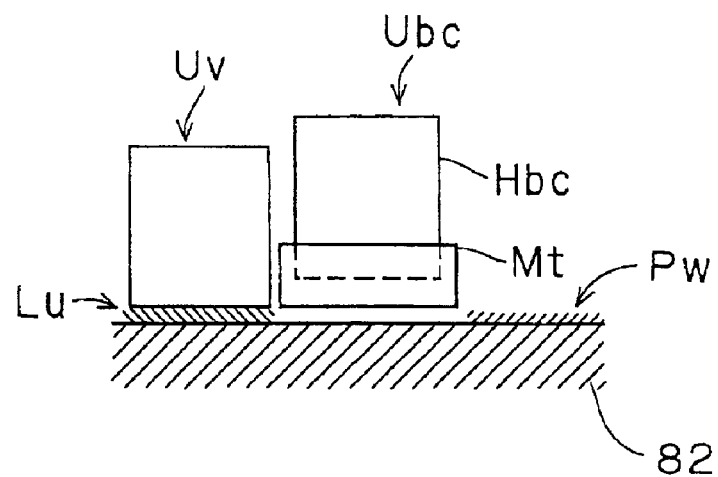

As for the discharge head Hbc shown in FIG. 24, it is preferably configured as shown in FIG. 31(a). That is, a head mount Mt for detachably holding the discharge head Hbc is provided. With this head mount Mt, it is possible to cut ultraviolet rays Lu (denoted by diagonal lines) leaking from the ultraviolet irradiation unit Uv adjacent thereto as shown in FIG. 31(b), as well as it is possible to protect the discharge head Hbc from the powder material Pw scattered on the powder layer 82.

<Alternative Embodiments>

As for the three-dimensional molding apparatus according to the second preferred embodiment, it is not necessary to use two kinds of powder materials for each layer of powder material, but plural kinds of powder materials may be selected for each three-dimensional molded article. In this case, powder materials to be removed are also the same kinds, so that recycle will be easier.

As for the two kinds of powder materials in the above second preferred embodiment, a combination of a cheap material and an expensive material is also possible without limited to the combination of different particle sizes. In this case, by using the expensive material in the conspicuous part of molded article and using the cheap material in the remaining part, it is possible to suppress the increase of cost.

Furthermore, a combination of a light material and a heavy material is also possible. In such a case, a balance of weight in the three-dimensional molded article can be controlled.

As for the coloring in each of the above preferred embodiments, it is not necessary to apply ink of three primary colors of Y, M, C, and three colors of R(red), G(green) and B(blue) can be applied.

Furthermore, it is not necessary to perform coloring by using ink, and coloring can be performed by using toner or the like.

As for the binder in each of the above preferred embodiments, it is not necessary to use a binder such as ultraviolet-ray hardening resin that hardens in response to the light of wavelength in the ultraviolet band region, and for example, a liquid binder such as visible light hardening resin that hardens in response to the light of wavelength in the visible band region may be used, and additionally a liquid binder such as thermosetting resin that hardens in response to a certain heat energy may be used.

In the case of using the visible light hardening resin, means for emitting light of wavelength in the visible region is provided in place of the above mentioned ultraviolet irradiation section. Furthermore, in the case of using a thermosetting resin, a heater for emitting heat energy is provided in place of the above mentioned ultraviolet irradiation section so that the molding region is located in the area where heat energy is supplied when the heater is scanned, thereby making the energy supply amount in the molding region approximately uniform.

Figure 32:
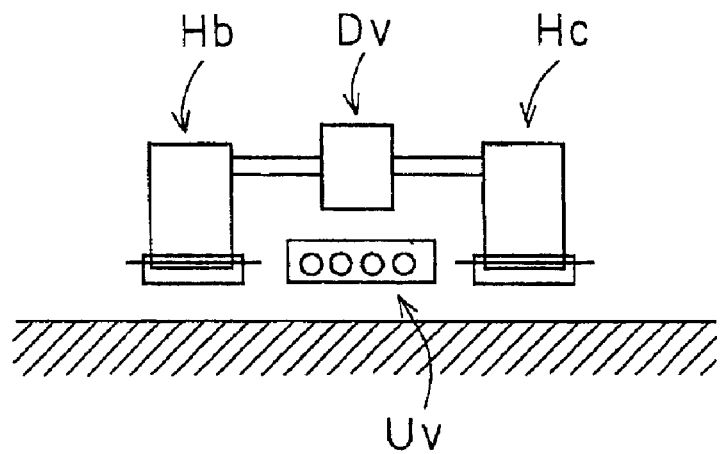
FIG. 32 is a view showing a configuration of a discharge head according to an alternative embodiment of the present invention.

In the binder applying section of the configuration as shown in FIG. 20, the discharge heads Hb, Hc may be connected with each other by means of a common driving mechanism Dv, thereby making the discharge heads Hb, Hc scan in synchronous with each other as shown in FIG. 32. In this case, the driving mechanism for driving the discharge heads Hb, Hc can be simplified.

Figure 33:
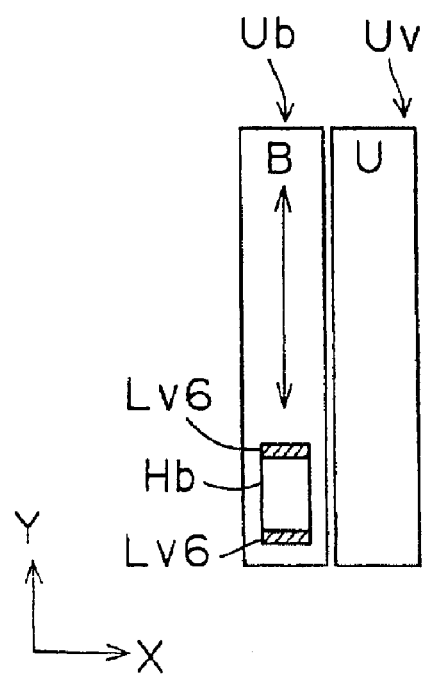
FIG. 33 is a view showing a configuration of a binder discharge unit according to an alternative embodiment of the present invention.

As for the binder discharge unit Ub, two light sources Lv6 for emitting ultraviolet rays can be added to the discharge head Hb as shown in FIG. 33. With this configuration, by the secondary scan of the binder discharge unit Ub and the primary scan of the discharge head Hb, it is possible to irradiate the whole surface of the powder layer with ultraviolet rays by the light source Lv6. In this case, the light source Lv6 is designed to emit ultraviolet rays having larger intensity than those emitted from the ultraviolet irradiation unit Uv. This is because if the binder of ultraviolet-ray hardening resin is irradiated with intense ultraviolet rays, followed by irradiation with weak ultraviolet rays, hardening of the binder is made easier. This ensures the binder to appropriately harden.

The ultraviolet irradiation section may be configured as exemplified below.

Figure 34:
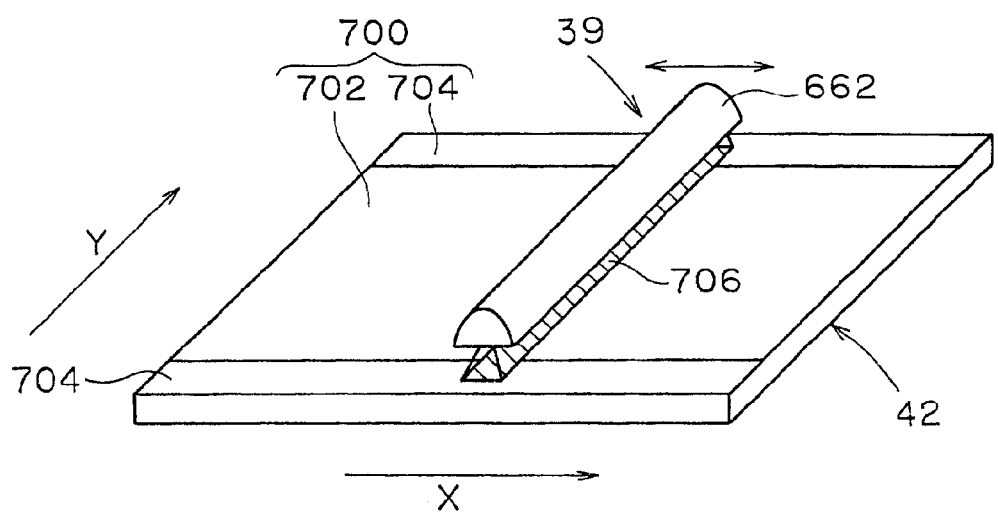
FIG. 34 is a schematic perspective view showing one example of relationship between a molding stage of the molding section and the ultraviolet irradiation section.

FIG. 34 is a perspective view showing one example of relationship between the molding stage 42 of the molding section 40 and the ultraviolet irradiation section 39. As described above, the molding stage 42 has a rectangular XY cross section, and the molding stage 42 is configured so that a uniform powder layer is formed on its entire top surface (hereinafter, referred to as powder extension region) 700 by means of the extension roller section 21. The ultraviolet irradiation section 39 is capable of reciprocally moving in the X direction, and the ultraviolet lamp 661 and the reflector 662 are elongated by predetermined lengths in the downward direction. Formation of a molded article is conducted in a first region (hereinafter, referred to as a molding region) 702 having a boundary at a predetermined width inward from both ends with respect to the Y direction of the powder extension region 700 to the inside of the powder extension region 700. Furthermore, a region 704 excluding the molding region 702 in the powder extension region 700 is referred to as a non-effective region 704.

FIGS. 35A and 35B are views showing a distribution of ultraviolet intensity I on the molding stage 42 with respect to the longitudinal direction (Y direction) of the ultraviolet lamp 661. In the ultraviolet lamp, irradiation intensity is approximately uniform in areas other than the vicinity of the both ends because of its structure, and since the irradiation intensity is weak in the vicinity of the both ends, as shown in FIG. 35A, the intensity of ultraviolet ray is weak in the vicinity of the both ends of the ultraviolet irradiation region on the molding stage 42. Therefore, if there is a region in which intensity of ultraviolet ray is insufficient in the molding region, the binder does not harden satisfactory, which leads formation of a molded article not having a sufficient strength. In view of this, as shown in FIGS. 34 and 35B, the ultraviolet irradiation region 706 on the molding stage 42 is set to be larger than the molding region 702 with respect to the Y direction (in other words, the molding region (first region) 702 is included in a region which is irradiated with ultraviolet rays when the ultraviolet irradiation section 39 is scanned in the X direction (second region)), whereby the intensity of ultraviolet ray is approximately uniform in the molding region 702 when the ultraviolet irradiation section 39 is scanned in the X direction.

As described above, since the ultraviolet irradiation section 39 is configured to move from left to right (+X direction) and right to left (−X direction) on the molding stage 42, non-effective region where molding is not performed is not specially provided on both ends with respect to the X direction of the powder extension region 700. However, in such a configuration that the ultraviolet irradiation section 39 reciprocally moves in the X direction only on the molding stage 42, also for the X direction, irradiation intensity is weak in the vicinity of both ends of the ultraviolet lamp 661 compared to other areas, so that it is preferred to provide a non-effective region also in the vicinity of the both ends of the powder extension region 700 with respect to the X direction.

As described above, the computer 11 generates, as cross section data generating means, cross section data, however, this cross section data is set to be molded only in the molding region.

Figure 36:
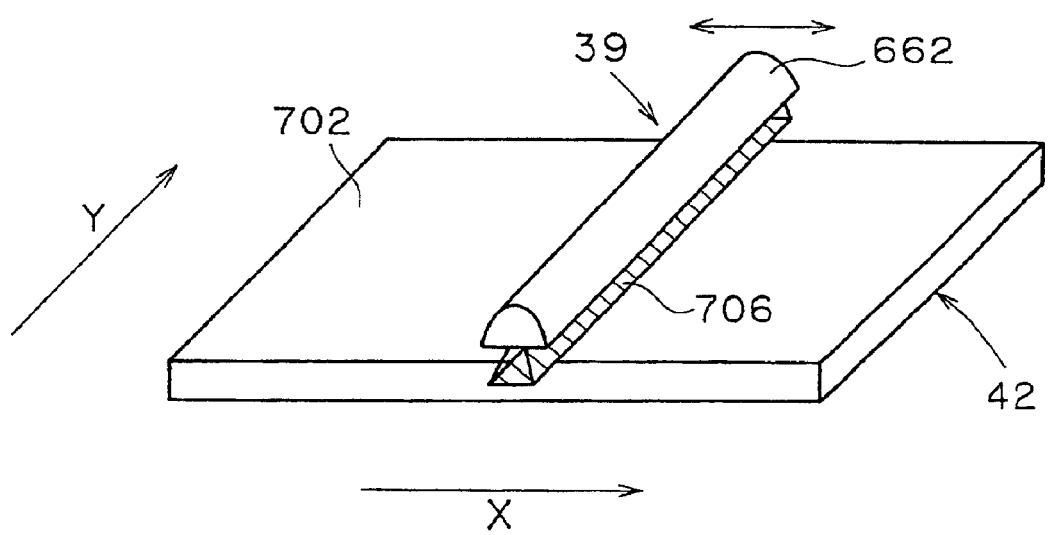
FIG. 36 is a schematic perspective view showing another example of relationship between the molding stage of the molding section and the ultraviolet irradiation section.

FIG. 36 is a schematic perspective view showing another example of relationship between the molding stage of the molding section and the ultraviolet irradiation section 39. In this example, the entire top surface of the molding stage which is the powder extension region and the molding region 702 are made into correspondence with each other. Then, as is the case of the example shown in FIG. 34, it is configured that the intensity of ultraviolet ray of the ultraviolet irradiation region 706 is approximately uniform in the molding region (first region) 702.

Figure 37A:
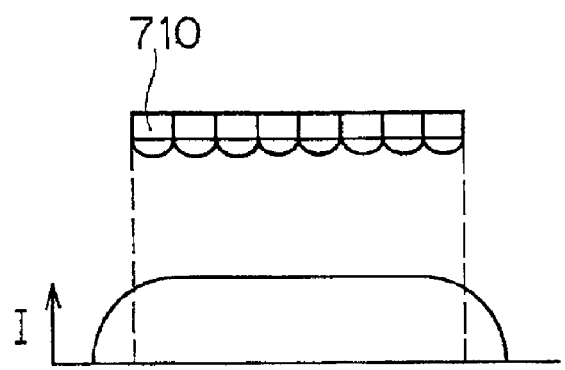
FIG. 37A is a view showing a relationship between an ultraviolet light source composed of a plurality of ultraviolet emitting portions arranged in a predetermined direction, and an intensity of ultraviolet ray on the molding stage.
Figure 37B:
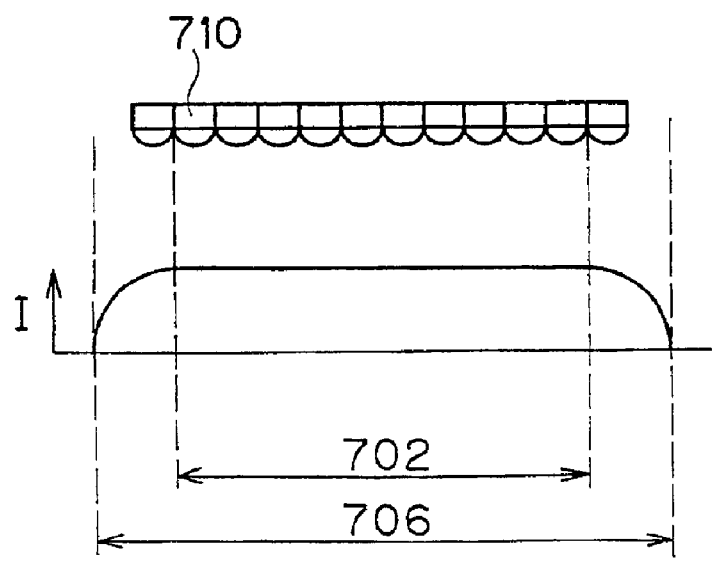
FIG. 37B is a view showing a relationship between the ultraviolet irradiation region on the molding stage by the ultraviolet light source in FIG. 37A and the molding region.

Even in the case where a plurality of ultraviolet emitting parts 710 (for example, LED (light emitting diode), LD (semiconductor laser))are arranged in the Y direction without nearly no interval in place of the ultraviolet lamp as a light source of ultraviolet rays, as shown in FIG. 37A, irradiation intensity in the vicinity of the both ends in the longitudinal direction of the light source is weak. Therefore, as shown in FIG. 37B, the ultraviolet irradiation region 706 is set to be larger than the molding region 702 with respect to the Y direction (in other words, the molding region (first region) 702 is included in a region which is irradiated with ultraviolet rays when the ultraviolet irradiation section is scanned in the X direction (second region)), whereby the intensity of ultraviolet ray is approximately uniform in the molding region 702 when the ultraviolet irradiation section is scanned in the X direction.

The relationship between the molding region (first region) and the region which is irradiated with ultraviolet rays when the ultraviolet irradiation section is scanned (second region) is not limited to the examples explained with the use of FIGS. 34 to 37B, but any configurations in which the first region is included in the second region are with in the scope of the present invention.

While the invention has been described in detail, the foregoing description is in all aspects illustrative and not restrictive. It is understood that numerous other modifications and variations can be devised without departing from the scope of the invention.

What is claimed is:

1. A three-dimensional molding apparatus for forming a three-dimensional molded article by binding a powder material, said apparatus comprising:
    (a) a layer formation device for sequentially forming a layer of a powder material;
    (b) a binder applying device for applying a binder which will harden in response to certain energy to a selected region in said layer of the powder material; and
    (c) an energy supply device for supplying said certain energy to said binder applied to said powder material,
    wherein a bound body of said powder material is formed by said binder to harden in response to said certain energy supplied from said energy supply device, said energy supply device and said binder applying device are integrally configured, and said binder applying device applies binder during a primary scanning in a first direction while said energy supplying device supplies said certain energy during a secondary scanning in a second direction, reverse said first direction.

2. A three-dimensional molding apparatus for forming a three-dimensional molded article by binding a powder material, said apparatus comprising:
    (a) a layer formation device for sequentially forming a layer of a powder material;
    (b) a binder applying device for applying a binder which will harden in response to certain energy to a selected region in said layer of the powder material;
    (c) an energy supply device for supplying said certain energy to said binder applied to said powder material; and
    (d) a coloring device for supplying a coloring carrier to a region to be colored in said bound body after said bound body of the powder material is formed,
    wherein a bound body of said powder material is formed by said binder to harden in response to said certain energy supplied from said energy supply device.

3. The three-dimensional molding apparatus according to claim 2, wherein said coloring device has a plurality of nozzles for discharging coloring carries of different colors, respectively.

4. The three-dimensional molding apparatus according to claim 2, wherein said region to be colored is in the vicinity of a surface of said three-dimensional molded article.

5. The three-dimensional molding apparatus according to claim 1, wherein said binder will harden in response to light energy of a predetermined wavelength.

6. The three-dimensional molding apparatus according to claim 1, wherein said binder will harden in response to heat energy.

7. The three-dimensional molding apparatus according to claim 1, wherein said layer formation device includes a feeder for feeding plural kinds of powder materials.

8. The three-dimensional molding apparatus according to claim 7, wherein said energy supply device can selectively feed said plural kinds of powder materials to a plurality of regions for each layer of said powder material.

9. The three-dimensional molding apparatus according to claim 1, wherein said binder applying device discharges said binder by means of a piezo-electric device and supplies said binder to said selected region.

10. The three-dimensional molding apparatus according to claim 1, wherein said bound body related to said layer of the powder material is formed by activating said binder applying device and said energy supply device in synchronism with activation of said layer formation device.

11. A three-dimensional molding apparatus for forming a three-dimensional molded article by binding a powder material, said apparatus comprising:
   (a) a layer formation device for sequentially forming a layer of a powder material;
   (b) a binder applying device for applying a binder which will harden in response to certain energy to a selected region in said layer of the powder material; and
   (c) an energy supply device for supplying said certain energy to said binder applied to said powder material; wherein
   a bound body of said powder material is formed by said binder to harden in response to said certain energy supplied from said energy supply device,
   said energy supply device supplies said certain energy to each layer of said powder material which is formed sequentially,
   said bound body related to said layer of the powder material is formed by activating said binder applying device and said energy supply device in synchronous with activation of said layer formation device, and
   said binder applying device is disposed between said layer formation device and said energy supply device.

12. The three-dimensional molding apparatus according to claim 1, wherein the bound body related to said layer of the powder material is formed by activating said binder applying device and said energy supply device after said layer of powder material has been formed by activating said layer formation device.

13. A three-dimensional molding apparatus for forming a three-dimensional molded article by binding a powder material, said apparatus comprising:
   (a) a layer formation device for sequentially forming a layer of a powder material;
   (b) a binder applying device for applying a binder which will harden in response to certain energy to a selected region in said layer of the powder material; and
   (c) an energy supply device for supplying said certain energy to said binder applied to said powder material; and
   a holding device for holding said layer formation device and said binder applying device and said energy supply device in integrated manner, wherein
   a bound body of said powder material is formed by said binder to harden in response to said certain energy supplied from said energy supply device,
   said energy supply device supplies said certain energy to each layer of said powder material which is formed sequentially,
   the bound body related to said layer of the powder material is formed by activating said binder applying device and said energy supply device after said layer of powder material has been formed by activating said layer formation device, and
   in said holding device, said energy supply device is disposed between said layer formation device and said binder applying device.

14. A three-dimensional molding apparatus for forming a three-dimensional molded article by binding a powder material, said apparatus comprising:
   (a) a layer formation device for sequentially forming a layer of a powder material;
   (b) a binder applying device for applying a binder which will harden in response to certain energy to a selected region in said layer of the powder material; and
   (c) an energy supply device for supplying said certain energy to said binder applied to said powder material; and
   a holding device for holding said layer formation device and said binder applying device and said energy supply device in integrated manner, wherein
   a bound body of said powder material is formed by said binder to harden in response to said certain energy supplied from said energy supply device,
   said energy supply device supplies said certain energy to each layer of said powder material which is formed sequentially,
   the bound body related to said layer of the powder material is formed by activating said binder applying device and said energy supply device after said layer of powder material has been formed by activating said layer formation device, and
   in said holding device, said binder applying device is disposed between said energy supply device and said layer formation device.

15. A three-dimensional molding apparatus for forming a three-dimensional molded article by binding a powder material, said apparatus comprising:
   (a) a layer formation device for sequentially forming a layer of a powder material in a first region;
   (b) a binder applying device for applying a binder which will harden in response to a certain energy to a selected region in said layer of the powder material; and
   (c) an energy supply device for supplying said certain energy to a second region involving said first region at a first intensity and for supplying said certain energy to a remainder of said first region at a second intensity, less than the first intensity,
   wherein a bound body of said powder material is formed by said binder to harden in response to said certain energy supplied from said energy supply device.

16. The three-dimensional molding apparatus according to claim 15, wherein said energy supply device supplies said certain energy to each layer of said powder material which is formed sequentially.

17. A three-dimensional molding apparatus for forming a three-dimensional molded article by binding a powder material, said apparatus comprising:
   (a) a layer formation device for sequentially forming a layer of a powder material in a first region;
   (b) a binder applying device for applying a binder which will harden in response to a certain energy to a selected region in said layer of the powder material;

(c) an energy supply device for supplying said certain energy to a second region involving said first region; and a coloring device for supplying a coloring carrier to a region to be colored in said bound body after said bound body of the powder material is formed, wherein a bound body of said powder material is formed by said binder to harden in response to said certain energy supplied from said energy supply device.

18. A three-dimensional molding method for forming a three-dimensional molded article by binding a powder material, the method comprising the step of:

(a) sequentially forming a layer of a powder material;

(b) applying a binder which will harden in response to a certain energy to a selected region in said layer of the powder material;

(c) supplying said certain energy to said binder applied to said powder material; and (d) supplying a coloring carrier to a region to be colored in said bound body after said bound body of the powder material is formed, wherein a bound body of said powder material is formed by said binder to harden in response to said certain energy supplied from said energy supply device.

19. A three-dimensional molding method for forming a three-dimensional molded article by binding a powder material, comprising the steps of:

(a) sequentially forming a layer of a powder material in a first region;

(b) applying a binder which will harden in response to a certain energy to a selected region in said layer of the powder material; and (c) supplying said certain energy to a second region involving said first region at a first intensity while supplying said certain energy to a remainder of said first region at a second intensity, less than the first intensity, wherein a bound body of said powder material is formed by said binder to harden in response to said certain energy supplied from said energy supply device at said first intensity.

* * * * *